(12) United States Patent
Hata

(10) Patent No.: US 6,314,239 B1
(45) Date of Patent: Nov. 6, 2001

(54) DEVICE FOR PREVENTING UNAUTHORIZED RECYCLING OF LENS-FITTED PHOTO FILM UNIT

(75) Inventor: Yukitsugu Hata, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/604,126

(22) Filed: Jun. 26, 2000

(30) Foreign Application Priority Data

Jun. 25, 1999 (JP) .................................................. 11-180842
Jun. 25, 1999 (JP) .................................................. 11-180843

(51) Int. Cl.[7] .............................. G03B 1/66; G03B 17/02; G03B 17/36; G03B 15/03
(52) U.S. Cl. ................................ 396/6; 396/155; 396/284
(58) Field of Search ................................ 396/6, 155, 205, 396/206, 303, 284, 277, 511

(56) References Cited

U.S. PATENT DOCUMENTS

| | | |
|---|---|---|
| 5,418,585 | 5/1995 | Petruchik et al. ..................... 354/76 |
| 5,502,529 | 3/1996 | Zander ............................... 354/127.1 |
| 5,517,265 | 5/1996 | Zander et al. ......................... 354/76 |
| 5,574,337 | * 11/1996 | Dunsmore ........................ 315/241 P |

* cited by examiner

Primary Examiner—Christopher E. Mahoney
(74) Attorney, Agent, or Firm—Young & Thompson

(57) ABSTRACT

A switching circuit is connected to an oscillation transistor of a charging circuit of a flash device of a lens-fitted photo film unit, for turning on or off the oscillation transistor. When a rear cover of a unit body of the film unit is separated, a battery for supplying the flash device is disconnected from the flash device through an insulating plate that is provided on the front cover. Thereafter when the battery or a new battery is connected to the flash device, a clear circuit outputs a clear signal to the switching circuit and a restoring circuit to initialize these circuits. In the initialized position, the switching circuit turns off the oscillation transistor, and maintains this switching condition until a restore signal is applied from the restoring circuit. The restoring circuit outputs the restore signal only when a predetermined cancel signal is applied from an external device. As the cancel signal, a voltage signal with a predetermined voltage level and a pulse signal with a predetermined pulse number have to be concurrently inputted to the restoring circuit within a predetermined time period.

17 Claims, 14 Drawing Sheets

DEVICE FOR PREVENTING UNAUTHORIZED RECYCLING OF LENS-FITTED PHOTO FILM UNIT

BACKGROUND OF THE INVENTION

1. Field of the Invention

The present invention relates a lens-fitted photo film unit with a flash device, and more particularly to a security device for the flash device, that makes the flash device unusable unless a restore signal is applied to the security device, thereby preventing unauthorized reuse of the flash device.

2. Background Arts

A variety of lens-fitted photo film units have been widely sold in the markets. The lens-fitted photo film unit, hereinafter called simply film unit, contains a roll of unexposed photo filmstrip and a cartridge shell, and has simple photographic mechanisms for exposing the filmstrip. Many kinds of film units are also provided with a built-in flash device. After being used up, the film units are recovered by their manufacturers for reusing some parts in new film units and recycling other parts as row materials.

However, there are some traders who collect used-up and emptied film units, and load unexposed photo film cartridges in the emptied film units for unauthorized sale. Since those traders do not make sufficient inspections on the recycled film units, nor repair inadequate part s of the film units, these unauthorized recycled film units may be of lesser quality than those recycled by authorized manufacturers. As the troubles with the recycled film units can smirch reputation of the film units in general, the film unit manufacturers have been trying to prevent the informal recycling of the film units by other traders.

In order to prevent that informal recycling, some film units are so designed that a functionally essential member has to be broken for disassembling the film unit. For instance, parts of unit housing are joined together by ultrasonic welding or the like, so these parts would be broken if they are forcibly separated. In other kinds of film units, a hook is formed with a part such that the hook pulls and breaks a functional member on another part when these parts are separated from each other.

As a preventive measure for that informal recycling, it is known in the art to electrically disable a photographic function of the film unit when all available frames have been photographed on the filmstrip or when the photo film cartridge is removed from the film unit. An exemplary of this type is disclosed in Japanese Laid-open Patent Application No.8-240884 (U.S. Pat. No. 5,517,265), wherein an IC with a counter is mounted in the film unit, for counting the number of frames. When the last available exposure is performed, an electric photographic device such as the flash device is disabled. In order to reuse the flash device, the manufacturer reads out an identification code from a memory of the IC through a specific external device, and inputs a reset code that corresponds to the identification code in the IC. Then the reset code is compared to an enablement code in the IC, and if the reset code and the enablement code are identical, the counter is initialized, and the photographic functions are recovered. Thus, the flash device comes to be reusable.

There are also those film units which contain a new type photo film cartridge called IX240 type. Because the photo film cartridge of this type uses a plastic shell, if ultrasonic welding is used for securing the parts of the unit body to each other, the plastic shell can be unexpectedly joined to the unit body. Therefore, it is hard to use ultrasonic welding for this type of film units. Concerning the second method of breaking a functional member by a hook, if the hook is not accurately formed, it can break the function part at the assembling, or cannot provide a sufficient effect. Beside these disadvantages, since a functional member of the film unit is broken, the manufacturer itself cannot reuse that member, so it is necessary to substitute a new one for that member in reassembling the film unit.

On the other hand, the method of electrically preventing the film unit from being informally reused is preferable in view of the fact that there is no need for breaking a functional of the film unit, and thus any functional member may be reused if its function has no problem. However, in order to make it hard for other traders to recover the function of the disabled film unit, the identification code or the enablement code must be a cipher code. In that case, it is necessary to provide a memory for storing the cipher codes, a data exchange circuit for exchanging the identification code and the reset code, a microprocessor and a memory for checking coincidence of the enablement code and the reset code. Therefore, a large scale circuit must be mounted in the film unit, so the cost of manufacture is increased.

SUMMARY OF THE INVENTION

In view of the foregoing, an object of the present invention is to provide a security device for preventing unauthorized reuse of a film unit, that may be manufactured at a low cost, but securely prevents the film unit from being reused by anyone except the manufacturer of the film unit.

According to an aspect of the present invention, a film unit with a flash device comprises a security device for the flash device, and the security device is characterized by comprising:

first means for outputting a restore signal when a pulse signal having a predetermined number of pulses and a voltage signal having a predetermined voltage level are concurrently inputted from an external device; and second means for switching a switching element connected to the flash device, such that the second means switches the switching element to a disabling position for disabling charging capability of the flash device when a particular part of the film unit is removed or when completed use of the film unit is detected or when voltage of the battery goes below a lower limit, and that the second means switches the switching element to an enabling position for enabling the flash device to work in response to the restore signal.

According to a preferred embodiment, the first means outputs the restore signal only when entrance of the pulse signal to the restoring circuit is completed within a predetermined time from an initial input of the predetermined voltage level to the restoring circuit.

It is also possible to configure a first means to output the restore signal when a digital code signal representative of a binary code and having a predetermined voltage level is inputted serially to the first means in synchronism with a clock signal having a predetermined number of pulses.

According to another aspect of the invention, a lens-fitted photo film unit with a flash device is characterized by comprising:

a device for disconnecting the battery from the charging circuit in cooperation with removal of a particular part of the film unit;

a clear circuit for outputting a clear signal at each start of power supply from the battery to the charging circuit;

a restoring circuit for outputting a restore signal in response to a predetermined cancel signal that is applied from an external device; and a switching circuit connected to the charging circuit, the switching circuit being switched to a disabling position for disabling the charging circuit in response to the clear signal from the clear circuit or when power supply voltage from the battery goes below a particular lower limit, or alternatively to an enabling position for enabling the charging circuit to work in response to the restore signal from the restoring circuit.

BRIEF DESCRIPTION OF THE DRAWINGS

The above and other objects and advantages of the present invention will become apparent from the following detailed description of the preferred embodiments when read in association with the accompanying drawings, which are given by way of illustration only and thus are not limiting the present invention. In the drawings, like reference numerals designate like or corresponding parts throughout the several views, and wherein.

DETAILED DESCRIPTION OF THE EMBODIMENTS

Figure 1:
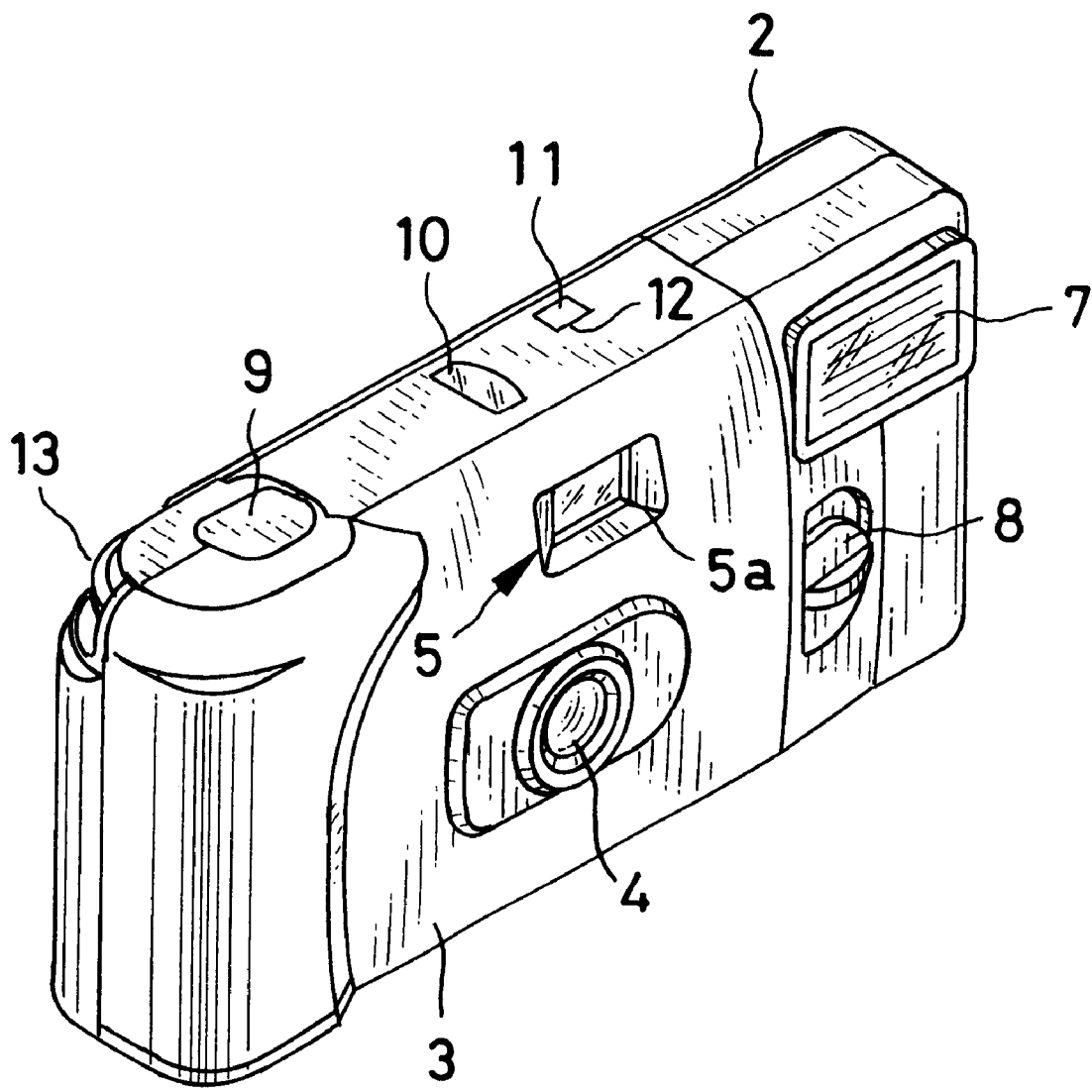
FIG. 1 is a perspective view of an example of a film unit with a flash device.
Figure 2:
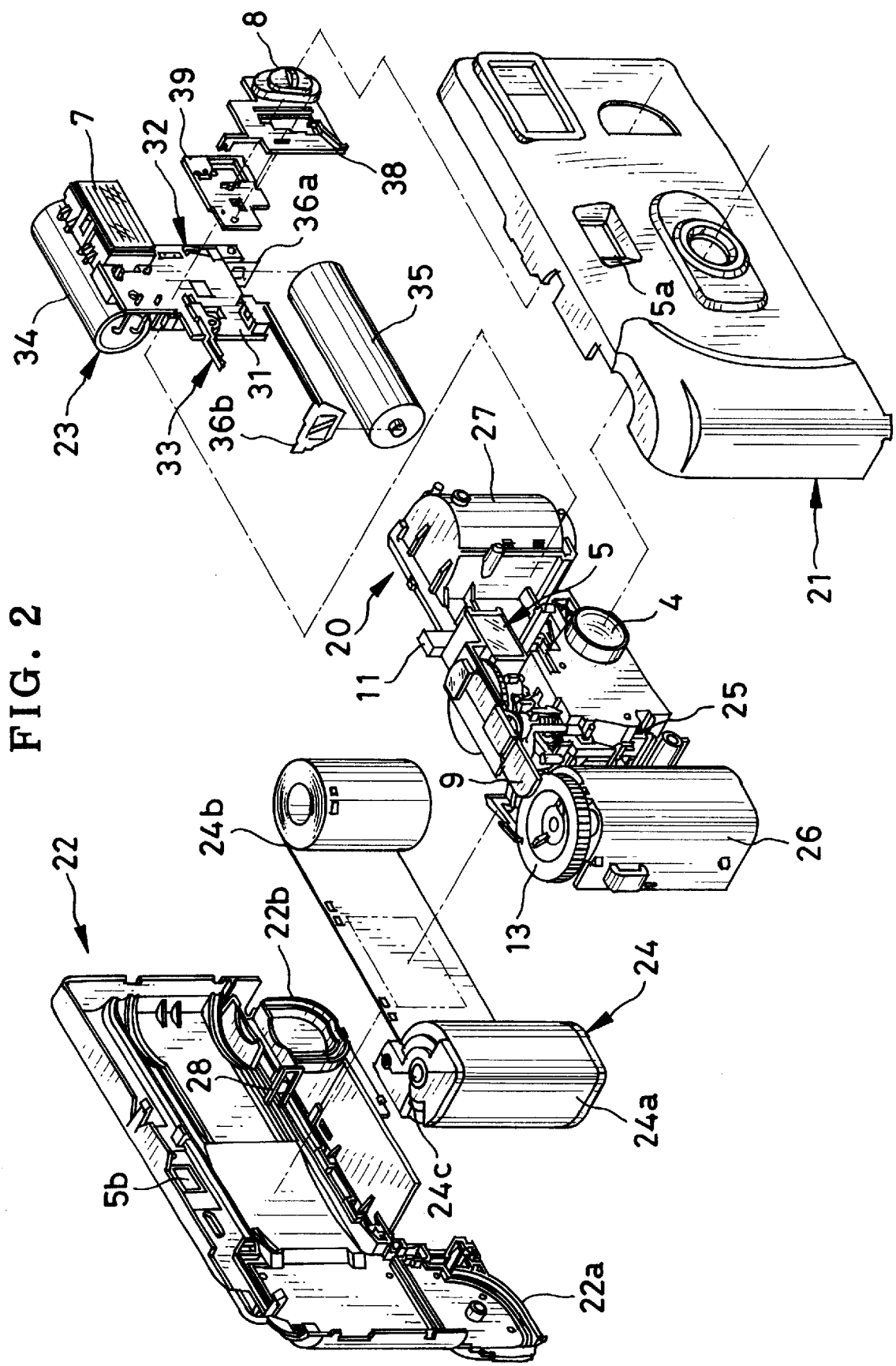
FIG. 2 is an exploded perspective view of the film unit of FIG. 1.

As shown in FIGS. 1 and 2, the film unit consists of a unit body 2 that has simple photographic mechanisms and contains a photo film cartridge 24, and a wrapping member 3 that is wrapped around the unit body 2. The unit body 2 is provided with a taking lens 4, a viewfinder 5, a flash projector 7, a flash operation member 8, a shutter button 9, a frame counter window 10, a flash charge indicator 11 for indicating completion of charging the flash device 23, and a film winding wheel 13, which are exposed to the outside. The flash charge indicator 11 is made of a light guide, and is protruded upward through an opening 12 when the flash operation member 8 is slid to an upper position to turn on the flash device 23.

The unit body 2 is constituted of a basic portion 20, a front cover 21, a rear cover 22, and the photographic mechanisms including the flash device 23. The photo film cartridge 24 is of IX240 type, consisting of a plastic cartridge shell 24a and a roll of photo filmstrip 24b.

The basic portion 20 is formed integrally with a light-tight exposure chamber 25 that is disposed in a front middle position of the basic portion 20. The taking lens 4 is mounted on the front of the exposure chamber 25, whereas a not-shown exposure aperture defining a frame exposure area is formed behind the exposure chamber 25. A cartridge chamber 26 for holding the cartridge shell 24a and a film chamber 27 for holding the rolled photo filmstrip 24b are integrally formed on opposite sides of the exposure chamber 25.

On the outside of the exposure chamber 25, there are provided a shutter mechanism for activating a not-shown shutter blade responsive to the shutter button 9 being pressed, a frame counting mechanism for counting the number of photographed frames, the flash charge indicator 11, an optical system of the viewfinder 5, and other photographic mechanisms.

The film winding wheel 13 is mounted on atop the cartridge chamber 26, and a not-shown drive shaft of the film winding wheel 13 is engaged with an upper end of a spool 24c of the photo film cartridge 24. By rotating the film winding wheel 13, the photo filmstrip 24b is wound up into the cartridge shell 24a one frame after each exposure.

The front cover 21 is formed with a finder objective window 5a, and openings for exposing the taking lens 4, the flash projector 7, and the flash operation member 8. The font cover 21 is attached to the front of the basic portion 20. The rear cover 22 covers the basic portion 20 from the rear side after the cartridge shell 24a and the photo filmstrip 24b are loaded in the cartridge chamber 26 and the film chamber 27, and closes bottom sides of these chambers 26 and 27 with bottom lids 22a and 22b in a light-tight fashion. The bottom lid 22a of the cartridge chamber 26 may be opened for removing the photo film cartridge 24 after the entire filmstrip 24b is exposed and wound up into the cartridge shell 24a. A finder eyepiece window 5b is formed through the rear cover 22. Also an insulating plate 28 is mounted on inside of the rear cover 22, for stopping power-supply to the flash device 23 when the rear cover 22 is detached from the basic portion 20.

The flash device 23 is a unit consisting of a flash circuit board 31 and members mounted to the flash circuit board 31, including the flash projector 7, a main switch 32, a synchronized flash trigger switch 33, a main capacitor 34, a battery 35, and a pair of metal contacts 36a and 36b for connecting the battery 35 to the circuit of the flash device 23. Designated by 38 and 39 in FIG. 2 are a switching plate having the flash operation member 8 formed thereon and a supporter plate that supports the switching plate 38 and guides it sliding up and down.

Figure 3:
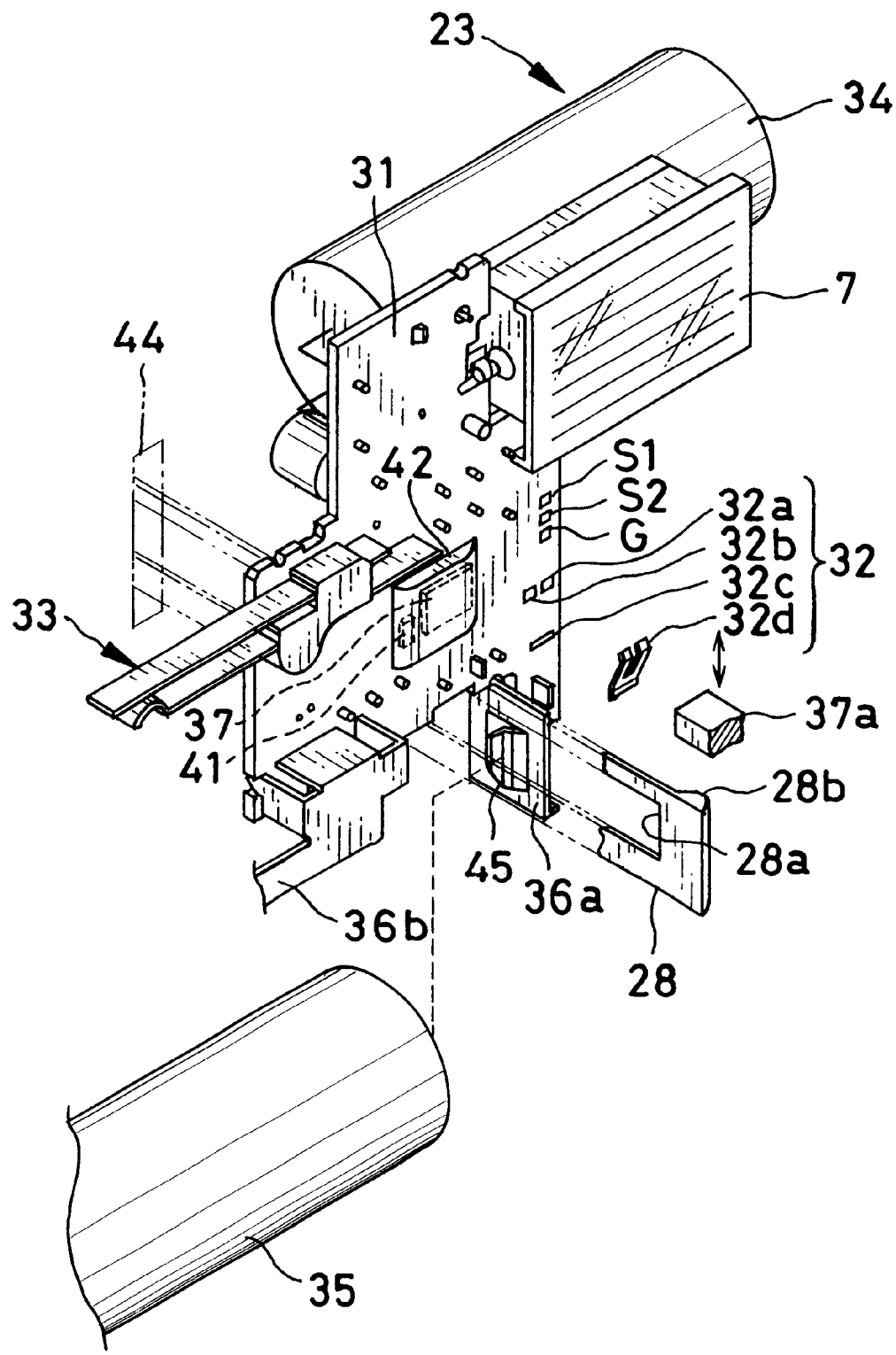
FIG. 3 is a perspective of the flash device provided with a security circuit according to an embodiment of the invention.

As shown in FIG. 3, the main switch 32 consists of three land contacts 32a, 32b and 32c that are formed on the circuit board 31, and a resilient metal contact strip 32d that is soldered to the contact 32c. With upward sliding of the flash operation member 8, a protuberance 37a on the back side of the switching plate 37 bends the metal contract strip 32d into contact with the other two contacts 32a and 32b, turning the main switch 32 on. The main switch 32 doubles as a charge switch and a flash on-off switch. When the main switch 32 is turned on, the flash device 23 starts charging the main capacitor 34 and is enabled to flash a strobe of light. When the main switch 32 is turned off, the flash device 23 stops charging and is disabled to flash.

The synchronized flash trigger switch 33 is constituted of a pair of contact strips, which are brought into contact with each other by the shutter blade when it is activated to make an exposure. Upon the synchronized flash trigger switch 33 being turned on, the main capacitor 34 is discharged to fire the flash projector 7.

On the flash circuit board 31 are mounted an IC 37 that constitutes a security circuit for preventing informal reuse of the flash device 23 and thus the film unit 2. The IC 37 as well as the flash device 23 is supplied from the battery 35. The IC 37 is designed to interrupt the flash device 23 from charging once the IC 37 is disconnected from the battery 35. The IC 37 also stops the flash device 23 from charging when the voltage of the supplied power becomes less than a predetermined level because of consumption of the battery 35 or the like.

The IC 37 and an oscillation transistor 41 of the flash device 23 are formed as surface mounting chips (SMC), and are covered with a protection layer 42 of an insulating material, such as a resin, together with printed wiring around these elements. The protection layer 42 is hard to remove, and is provided for protecting the security function from being disabled by some manipulations on the IC 37 or the oscillation transistor 41, such as removal of the IC 37, replacement of the oscillation transistor 41 with another oscillation transistor, connection of an additional jumper line and so forth. For example, the projection layer 42 covers a range 42a bounded by dashed line in FIG. 4. It is to be noted that the IC 37 and the oscillation transistor 41 are not necessarily formed as the surface mounting chips.

The battery 35 is held between the metal contacts 36a and 36b, and is placed under the exposure chamber 25. The metal contact 36a is formed with a contact tab 45 that is resiliently bendable, and a pole of the battery 35, a minus pole in this embodiment, is contacted with the contact tab 45. The insulating plate 28 is inserted in between the contact plate 36a and the battery minus pole through a slot 44 of the basic portion 20 when the rear cover 22 is attached to the basic portion 20. The insulating plate 28 has an opening 28a through which the contact tab 45 of the metal contact 36a is protruded toward the battery 35, allowing contact of the battery minus pole with the contact tab 45.

When the rear cover 22 is separated from the basic portion 20, the insulating portion 28b at the tip of the insulating plate 28 thrusts through between the battery minus pole and the metal contact 36a, so the contact tab 45 is bent away from the battery 35. Since the contact tab 45 and thus the metal contact 36a is disconnected from the battery 35 for a moment by the insulating portion 28b, the IC 37 as well as the flash device 23 is disconnected for that moment from the battery 35.

Because it is necessary to separate the rear cover 22 from the basic body 20 for loading a new photo film cartridge in the used-up unit body 2 of the film unit, and the power supply to the IC 37 is stopped temporarily by the insulating plate 28 when the rear cover 22 is separated from the basic body 20, the IC 37 prohibits charging the flash device 23 once the rear cover 22 is removed. Thus, the IC 37 prevents the used-up unit body 2 from being reused.

To re-enable the flash device 23 to work again, a predetermined cancel signal must be applied to the IC 37. In order for granted manufacturers to reuse the flash device 23, first and second input terminals S1 and S2 are provided on the flash circuit board 31, for inputting the cancel signal to the IC 37. A terminal G is a grand terminal for the flash device 23 including the IC 37.

Figure 4:
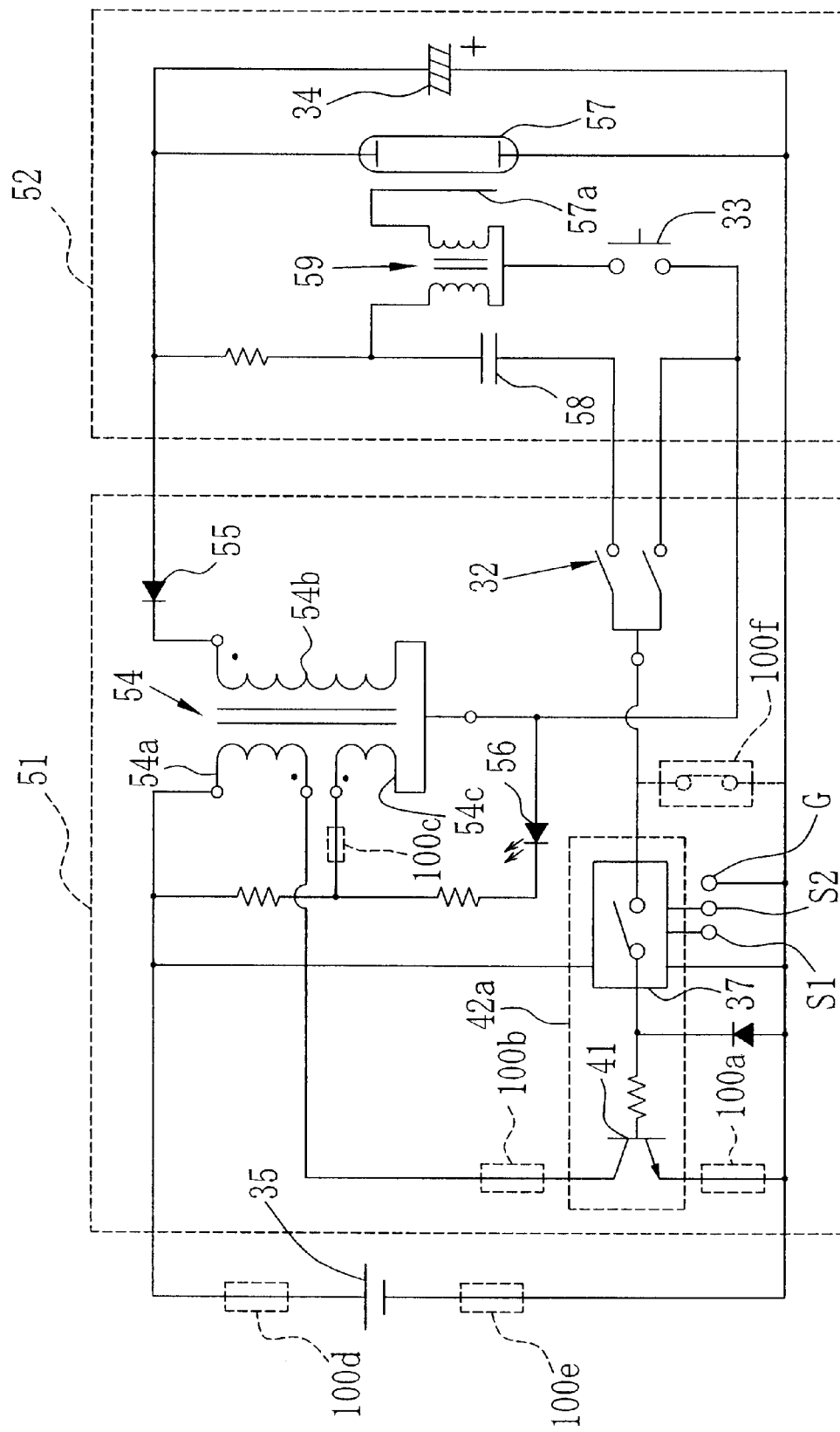
FIG. 4 is a circuit diagram of the flash device.

Referring to FIG. 4, the circuit of the flash device 23 may be roughly sectioned into a charging circuit 51, a discharging circuit 52, and the IC 37. The charging circuit 51 includes the oscillation transistor 41, an oscillation transformer 54, and a rectifying diode 55 as main components. The oscillation transistor 41 and the oscillation transformer 54 constitute a well-known blocking oscillator for transforming a low voltage of the battery 35 to a high voltage for charging the main capacitor 34.

When the main switch 32 is turned on, current flows into a base of the oscillation transistor 41 through a tertiary coil 54c of the oscillation transformer 54, so a current is conducted through a primary coil 54a of the oscillation transformer 54. As a result, electromotive power is induced in a secondary coil 54b of the oscillation transformer 54, so current flows through the secondary coil 54b into the base of the oscillation transistor 41. Because of this positive feedback, the base current of the oscillation transistor 41 increases, and thus the current through the primary coil 54a increases. In this way, the oscillation transistor 41 oscillates to cause the oscillation transformer 54 to generate alternating current of the high voltage across the secondary coil 54b. The alternating current is rectified through the rectifying diode 55, and is supplied to the discharging circuit 52.

A light emitting diode (LED) 56 is connected to the tertiary coil 54c, that is lighted when the main capacitor 34 is charged approximately up to a set charge voltage. The LED 56 is located under a bottom end of the light guide 11, so the light from the LED 56 is projected out of the unit body 2 through the light guide 11.

The discharging circuit 52 is mainly constituted of the synchronized flash trigger switch 33, the main capacitor 34, a flash discharge tube 57, a triggering capacitor 58, a triggering transformer 59. The main and triggering capacitors 34 and 58 are charged with the high voltage current from the charging circuit 51. When the synchronized flash trigger switch 33 is turned on while the main switch 32 is on, the triggering capacitor 58 discharges, and the discharged current flows through a primary coil of the triggering transformer 59. As a result, a triggering voltage of 4 KV is induced across a secondary coil of the triggering transformer 59, and is applied to the flash discharge tube 57 through a triggering electrode 57a. The triggering voltage causes dielectric breakdown of the flash discharge tube 57, so the main capacitor 34 is discharged through the flash discharge tube 57, and a flash light is radiated from the flash discharge tube 57.

The IC 37 is connected to a base of the oscillation transistor 41. Specifically, a switching element 60 of the IC 37 is connected to the base of the oscillation transistor 41, so the circuit from the battery 35 to the base of the oscillation transistor 41 is opened by turning off the switching element 60. Therefore, while the switching element 60 is off, the oscillation transistor 41 is deactivated, and the charging circuit 51 stops charging. The IC 37 is designed to turn off the switching element 60 as soon as the power supply to the IC 37 is terminated or when the voltage of the supplied power becomes less than the predetermined level. As mentioned above, the IC 37 keeps the flash device 23 inactive unless the cancel signal is applied thereto.

Figure 5:
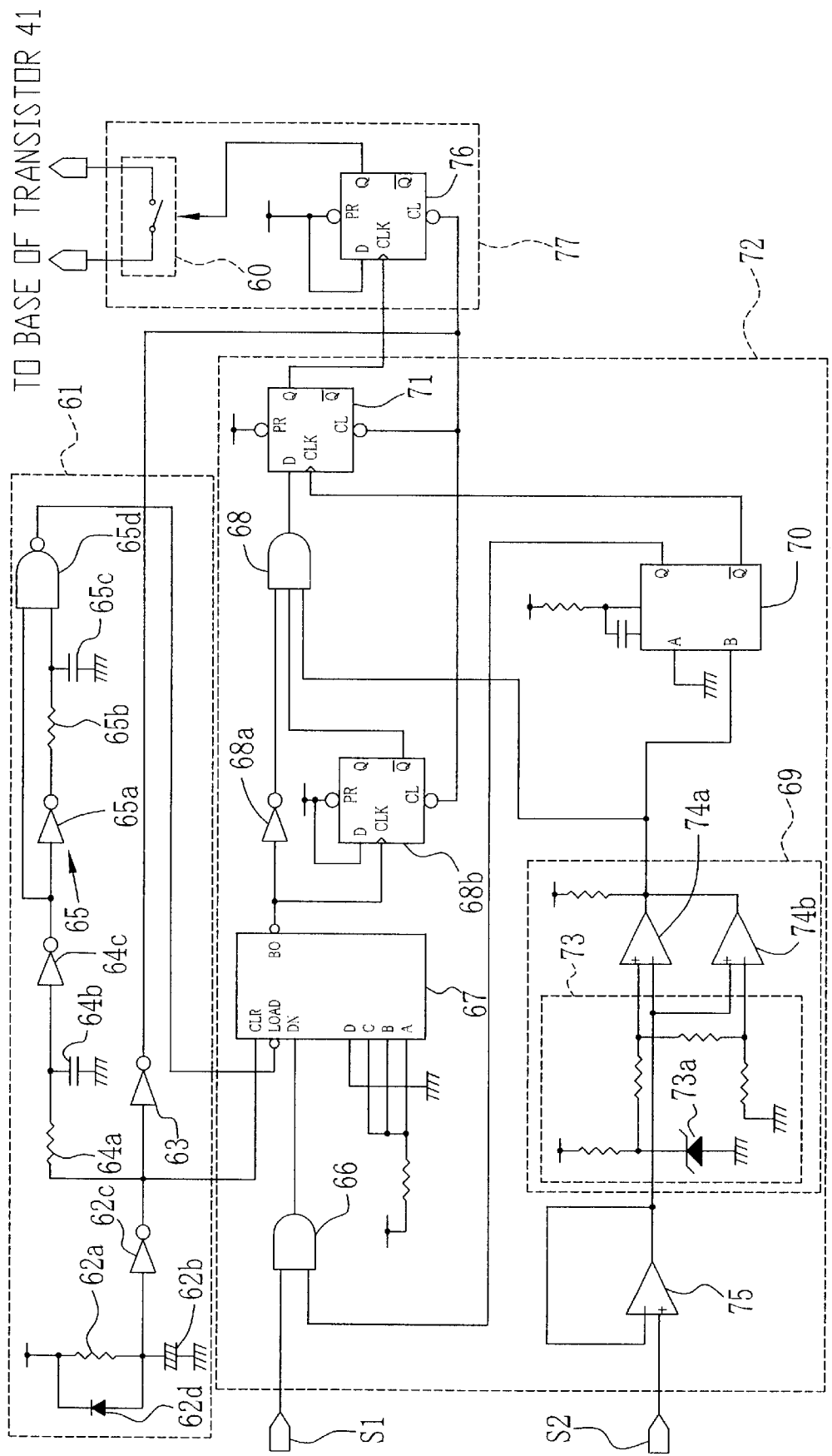
FIG. 5 is a circuit diagram of an embodiment of security circuit.
Figure 6:
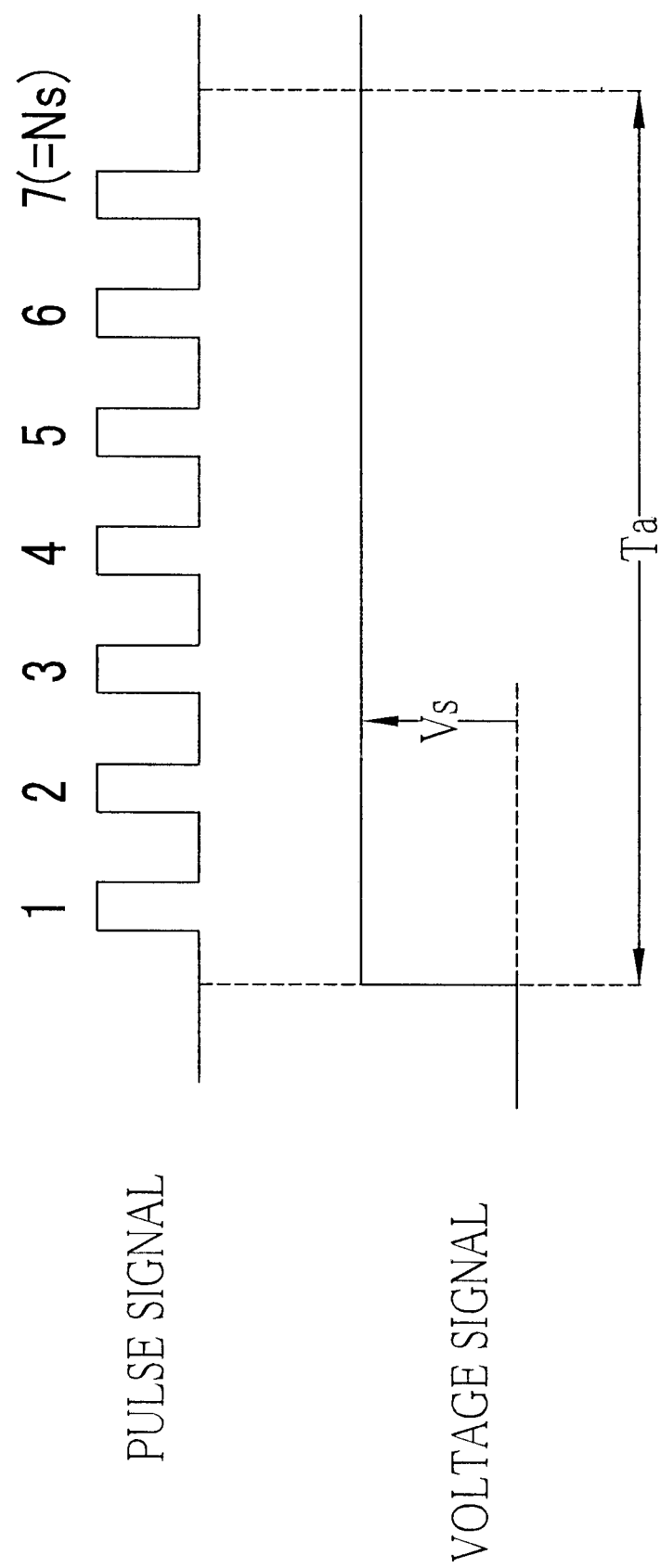
FIG. 6 is a waveform diagram illustrating a cancel signal for use with the security circuit of FIG. 5, the cancel signal being a combination of a pulse signal and a voltage signal.

FIG. 5 shows an embodiment of the IC 37, and FIG. 6 shows the cancel signal for the embodiment of FIG. 6, wherein the cancel signal consists of a pulse signal of a predetermined number of pulses Ns, and a voltage signal having a predetermined voltage level Vs. To work as the cancel signal, the predetermined number of pulses Ns are to be entered through the first input terminal S1 within a predetermined time period T1, while the voltage signal of the predetermined voltage level Vs is applied to the second input terminal S2.

In FIG. 5, a clear circuit 61 is provided for initializing respective components of the IC 37 each time the IC 37 starts being supplied. That is, the clear circuit 61 outputs a first clear signal of low (L) level for a predetermined time period after the start of power supply, through a resistor 62a, a capacitor 62b and a NOT circuit 62c. A diode 62d is provided for discharging the capacitor 62b at the stop of power supply, and thereby allowing the clear circuit 61 to generate the first clear signal at the next start of power supply. A NOT circuit 63 is connected to the output of the NOT circuit 62c. The NOT circuit 63 inverts the first clear signal and outputs it as a second clear signal of a high (H) level.

Figure 7:
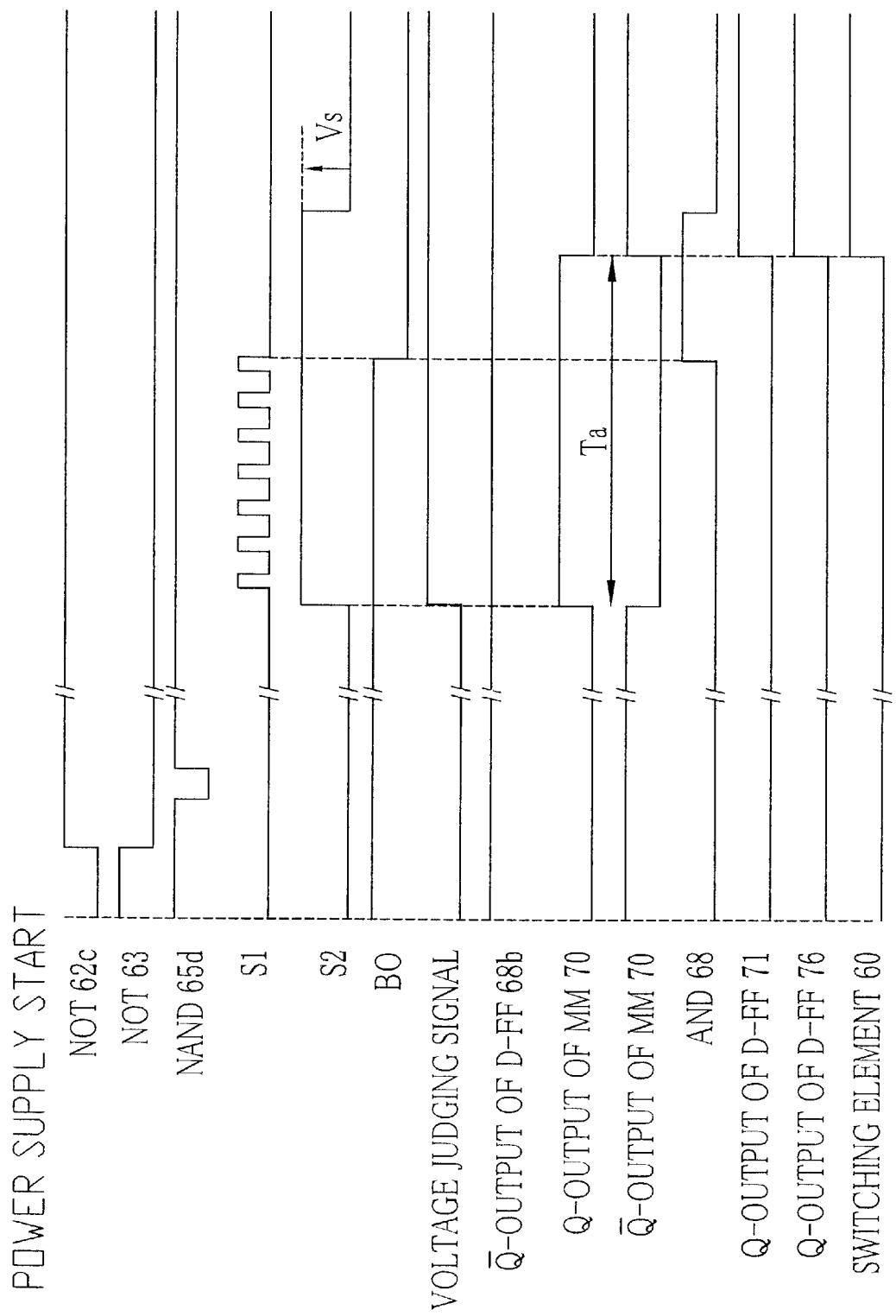
FIG. 7 is a timing chart illustrating operation of the security circuit of FIG. 5.

The output of the NOT circuit 62c is connected also to a delay circuit consisting of a resistor 64a, a capacitor 64b, a NOT circuit 64c, so the first clear signal from the NOT circuit 62c is sent to a preset signal generator circuit 65 after being delayed and inverted through the delay circuit 64a to 64c. The preset signal generator circuit 65 includes an integration circuit consisting of a NOT circuit 65a, a resistor 65b and a capacitor 65c, and a NAND circuit 65d connected to the integration circuit. The preset signal generator 65 outputs a preset signal from the NAND circuit 65d to a down counter 67. The preset signal is a pulse that drops to the L-level at a timing a little after the clear signals, as shown in FIG. 7.

The down counter 67, AND circuits 66 and 68, a comparator circuit 69, a non-triggerable monostable multivibrator (hereinafter called MM circuit) 70, a D-FF circuit 71 and other minor elements constitute a restoring circuit 72. The restoring circuit 72 outputs a restore signal when the pulse signal and the voltage signal are properly entered through the first and second input terminals S1 and S2.

Any signal applied to the first input terminal S1 is sent to a count down (DN) terminal of the down counter 67 through the AND circuit 66. Another input terminal of the AND circuit 66 is connected to a Q-terminal of the MM circuit 70, so the AND circuit 66 conducts the signal from the first input terminal S1 to the DN-terminal only while a high level signal is output from the Q-terminal of the MM circuit 70. As set forth in detail later, the MM circuit 70 outputs the H-level signal from its Q-terminal for a predetermined time Ta from a start of entrance of the predetermined voltage signal at the second input terminal S2.

A clear (CLR) terminal of the down counter 67 is connected to the output of the NOT circuit 62a of the clear circuit 61, so the down counter 67 is reset to zero upon the first clear signal from the clear circuit 61. Thereafter when the preset signal is applied to a LOAD-terminal, a predetermined number is preset as a count in the down counter 67. The preset count is determined to be equal to the predetermined pulse number Ns of the pulse signal, and may be defined by adjusting signal levels applied to A- to D-terminals of the down counter 67. According to the embodiment shown in FIGS. 6 and 7, the pulse number Ns and thus the preset count are "7".

The down counter 67 counts down one by one at each leading or rising edge of the input signal applied to the DN-terminal. When the input signal at the DN-terminal changes to the L-level after the count comes to zero, a BO signal from a borrow (BO) terminal of the down counter 67 changes to the L-level. If another pulse is entered to the DN-terminal after the BO signal takes the L-level, the BO signal changes to the H-level. Accordingly, the BO signal takes the L-level at the timing when seven pulses have been applied to the DN-terminal after the count of the down counter 67 is preset to "7". On the contrary, when more than or less than seven pulses are applied to the DN-terminal, the BO signal takes the H-level. The BO signal is sent to an input of the AND circuit 68 through a NOT circuit 68a.

The down counter 67 is a cyclic counter that automatically resets the count to a maximum value after counting down to zero, and starts counting down from the maximum value upon each input signal. Therefore, the BO signal takes the L-level also when the number of pulses applied to the DN-terminal come to be a multiple of the predetermined pulse number Ns. To determine whether the number of applied pulses is the predetermined value Ns or a multiple of Ns, a D-FF circuit 68b is connected to the BO-terminal.

The D-FF circuit 68b becomes to outputs a high level signal from its inverted Q-terminal when the second clear signal from the clear circuit 61 is applied to a clear (CL) terminal of the D-FF circuit 68b, and a high level signal is applied to a D-terminal of the D-FF circuit 68b. The BO signal is applied to a clock (CLK) terminal of the D-FF circuit 68b. According to this configuration, the D-FF circuit 68b outputs a low level signal from its inverted Q-terminal if the BO signal returns to the H-level for the first time after the start of power supply. The inverted Q-terminal of the D-FF circuit 68b is connected to another input of the AND circuit 68.

The comparator circuit 69 is mainly constituted of a voltage divider circuit 73 and a pair of comparators 74a and 74b, and is directed to judging whether the signal applied to the second input terminal S2 has the predetermined voltage level Vs. The signal applied to the second input terminal S2 is sent to the comparators 74a and 74b through a voltage follower 75. The voltage follower 75 is for tapping out a voltage to be compared in the comparators 74a and 74b from the signal applied from an external device to the second input terminal S2 without affecting the voltage of that signal. That is, the voltage level at the output of the voltage follower 75 is equal to the voltage level of the signal at the second input terminal S2.

Taking account of a little fluctuation of the voltage level of the signal applied to the second input terminal S2, the comparator circuit 69 has a tolerance of ±0.2 V. That is, the voltage divider circuit 73 outputs a first reference voltage Vref1 as an upper limit of the predetermined voltage level (=Vn+0.2 V) and a second reference voltage Vref2 as a lower limit of the predetermined voltage level (=Vn−0.2 V) by dividing the power source voltage of the battery 35. A Zener diode 73a is provided for maintaining these reference voltages Vref1 and Vref2 at the constant levels in spite of a little variation in the power source voltage.

The comparator 74a compares the voltage level from the voltage follower 75 with the first reference voltage Vref1, and outputs a high level signal when the voltage level is not more than the first reference voltage. Simultaneously, the comparator 74b compares the voltage level from the voltage follower 75 with the second reference voltage Vref2, and outputs a high level signal when the voltage level is not less than the second reference voltage Vref 2. In other cases, the comparator 74a or 74b outputs a low level signal. The outputs of the comparators 74a and 74b constitute an output of the comparator circuit 69, so a voltage judging signal from the comparator circuit 69 takes the H-level only while the voltage level of the signal applied to the second input terminal S2 is between the lower limit and the upper limit of the predetermined voltage level Vs. The voltage judging signal is sent to a third input of the AND circuit 68.

It is to be noted that the voltage level Vs may be determined to be more than the voltage of the battery 35 by setting the gain of the voltage follower 75 to be less than "1", or by obtaining the reference voltages for the comparators 74a and 74b from the output of the voltage follower 75.

Since the AND circuit 68 is supplied with the inverted BO signal from the NOT circuit 68a, the output signal from the inverted Q-terminal of the D-FF circuit 68b and the voltage judging signal, the AND circuit 68 outputs a high level signal only while these input signals take the H-level, i.e. when the predetermined number Ns of pulses are applied to the first input terminal S1, and at the same time the voltage signal applied to the second input terminal S2 is within the tolerance range of the predetermined voltage level Vs.

The voltage judging signal is also sent to a B-terminal of the MM circuit 70. The MM circuit 70 changes signal level at its Q-terminal from the L-level to the H-level when the voltage judging signal changes from the L-level to the H-level, and keeps the Q-terminal at the H-level for the predetermined time Ta. Concurrently with the output at the Q-terminal, signal level at an inverted Q-terminal of the MM circuit 70 takes the L-level for the predetermined time Ta.

The D-FF circuit 71 takes the L-level at its Q-terminal when it is initialized by the second clear signal that is applied to its CL-terminal from the clear circuit 61. A D-terminal and a clock terminal of the D-FF circuit 71 are connected to the output of the AND circuit 68 and the inverted Q-terminal of the MM circuit 70. According to this configuration, the D-FF circuit 71 latches the output signal from the AND circuit 68 and outputs it from its Q-terminal at a timing when the predetermined time Ta has passed since the comparator circuit 69 judges that the voltage level of the signal applied to the second input terminal S2 is within the tolerance range.

If the predetermined pulse signal and the predetermined voltage signal are entered, the output of the AND circuit 68 takes the H-level at that timing, so the signal level at the Q-terminal of the D-FF circuit 71 changes from the L-level to the H-level. However, if the number of pulses applied within the predetermined time Ta to the first input terminal S1 is less than or more than the predetermined number Ns, or the voltage level of the voltage signal applied to the second input terminal S2 is out of the tolerance range, the output of the AND circuit 68 stays in the L-level, so the signal level at the Q-terminal of the D-FF circuit 71 stays in the L-level.

The Q-terminal of the D-FF circuit constitutes an output of the restore circuit 72, and is connected to a clock terminal of a D-FF circuit 76. The D-FF circuit 76 and the switching element 60 constitute a switching circuit 77. As described above, the switching element 60 is connected to the base of the oscillation transistor 41 such that the circuit from the battery 35 to the base is opened by turning off the switching element 60. The switching element 60 is turned on and off by an output signal from a Q-terminal of the D-FF circuit 76. That is, when the output signal from the Q-terminal of the D-FF circuit 76 is high, the switching element 60 is turned on. The switching element 60 is turned off when the output signal from the Qterminal of the D-FF circuit 76 is low.

In the same way as the D-FF circuit 71, the D-FF circuit 76 is initialized by the second clear signal from the clear circuit 61, thereby setting the signal level at the Q-terminal at the L-level. A high level signal is applied to a D-terminal of the D-FF circuit 76 as being pulled-up.

According to this configuration, the switching element 60 is maintained off upon the L-level signal from the D-FF circuit 76 after the start of power supply, in addition to while the power supply stops. Even if some signals are applied to the input terminals S1 and S2, if these signals do not satisfy the conditions for the predetermined cancel signal, the output of the D-FF circuit 71 would not change to the L-level, so the switching element 60 is maintained off.

On the other hand, if the predetermined cancel signal is applied, the output of the D-FF circuit 71 changes from the L-level to the H-level after the predetermined time Ta. As the H-level signal from the D-FF circuit 71 is applied to the clock terminal of the D-FF circuit 76, the D-FF circuit 76 latches the H-level signal at its D-terminal, so it outputs the H-level signal from its Q-terminal to the switching element 60, turning on the switching element 60. Therefore, the H-level output from the D-FF circuit 71 is served as the restore signal in this embodiment.

Since it is necessary for generating the restore signal to enter the predetermined cancel signal under the predetermined condition which are hard to know for other traders than the granted manufactures, it is hard for those trader to remove the prohibition of charging by the security circuit. Since the security circuit has a simple construction consisting of logic circuits and other simple elements, and thus may be integrated into the IC chip at a low cost.

It is alternatively possible to use the output of the D-FF circuit 71 for turning on and off the switching element 60, instead of the output of the D-FF circuit 76. By adding a circuit for generating a preset signal to the down counter 67 after the output of the AND circuit 68 is latched by the D-FF circuit 71, it becomes impossible to turn on the switching element 60 by applying a pulse signal having a single pulse repeatedly at intervals of not less than the predetermined time Ta to the first input terminal S1, while the predetermined voltage level is applied to the second input terminal S2.

When manufacturing the above described film unit, first the cartridge shell 24a and the film strip 24b are placed respectively in the cartridge chamber 26 and the film chamber 27, and the rear cover 22 is attached to the basic portion 20 in a light-tight fashion. Next, the flash device 23 except the battery 35, which is already assembled in another manufacturing line, is attached to the basic portion 20. When assembling the flash device 23, the IC 37 is mounted on the flash circuit board 31, and the protection layer 42 is formed to cover the IC 37 and the oscillation transistor 41.

To mount the flash device 23, the flash circuit board 31 is located to insert the metal contact 36a in between the insulating plate 28 and the film chamber 27, while bending the contact tab 45 of the metal contact 36a resiliently to get over the insulating portion 28b of the insulating plate 28, and let the contact tab 45 fit in the opening 28a of the insulating plate 28. Thereafter, the battery 35 is put in between the metal contacts 36a and 36b, starting supplying the flash device 23 including the IC 37.

With the start of power supply from the battery 35, the clear circuit 61 outputs the first clear signal to the down counter 67 and the second clear signal to the D-FF circuits 68b, 71 and 76. Thereby, the output of the Q-terminal of the D-FF circuit 71 is reset to the L-level, and the output of the inverted Q-terminal of the D-FF circuit 68b is reset to the H-level, whereas the count of the down counter 67 is reset to zero. Thereafter, the down counter 67 presets the count to the predetermined pulse number Ns, i.e. "7" in this embodiment.

Because the output of the D-FF circuit 76 is also reset to the L-level by the second clear signal, even if the switching element 60 is turned on by a voltage fluctuation at the start of power supply, the switching element 60 is turned off immediately after the start of power supply. Therefore, the charging circuit 51 of the flash device 23 is disabled as soon as the battery 35 is connected to the flash device 23.

To re-enable the charging circuit 51 to work before shipping the newly manufactured film units from the factory, the basic portion 20 with the flash device 23 and the battery 35 is subjected to a process for entering the cancel signal to the IC 37. In this process, three output terminals of a specific cancel signal generator are connected to the first and second input terminals S1 and S2 and the grand terminal G.

The cancel signal generator outputs first the voltage signal of the predetermined voltage level Vs to the second input terminal S2, and then outputs the pulse signal of the predetermined pulse number Ns to the first input terminal S1. The cancel signal generator complete inputting the predetermined pulse signal within the predetermined time Ta while keeping on applying the predetermined voltage signal to the second input terminal S2.

While the predetermined voltage signal is applied to the second input terminal S2, the voltage judging signal from the comparator circuit 69 of the IC 37 takes the H-level. When the voltage judging signal changes to the H-level, the signal levels at the Q-terminal and the inverted Q-terminal of the MM circuit 70 respectively change to the H-level and the L-level, and are maintained in these levels for the predetermined time Ta. The signal change from the H-level to the L-level at the inverted Q-terminal of the MM circuit 70 does not affect the signal level at the Q-terminal of the D-FF circuit 71, as it is applied to the clock terminal of the D-FF circuit 71. Therefore, the signal level at the Q-terminal of the D-FF circuit 76 is also maintained unchanged.

Since the H-level signal from the Q-terminal of the MM circuit 70 is applied to one input of the AND circuit 66, the pulse signal applied to the first input terminal S1 is sent to the DN-terminal of the down counter 67. The down counter 67 counts down one by one at each leading edge of the pulse signal.

When the predetermined number Ns of pulses have been applied to the DN-terminal, that is, when the seventh pulse is applied to the DN-terminal in this embodiment, the down counter 67 counts down to zero. Then, at the trailing edge of the seventh pulse, the BO signal from the down counter 67 changes to the L-level. The L-level BO signal is inverted through the NOT circuit 68a, and is applied to the AND circuit 68. Since the H-level signal from the inverted Q-terminal of the D-FF circuit 68b and the H-level signal from the comparator circuit 69 are applied to the other inputs of the AND circuit 68, the output of the AND circuit 68 changes to the H level upon the H-level signal from the NOT circuit 68a. The H-level output from the AND circuit 68 is applied to the D-terminal of the D-FF circuit 71.

In the predetermined time Ta after the start of applying the predetermined voltage signal, the Q-terminal of the MM circuit 70 changes from the H-level to the L-level. Then, the AND circuit 66 stops conducting the signal at the first input terminal S1 to the down counter 67. Simultaneously, the inverted Q-terminal of the MM circuit 70 changes from the L-level to the H-level, so the D-FF circuit 71 latches the signal applied to its D-terminal from the AND circuit 68.

Since the AND circuit 68 outputs the H-level signal at that moment, the D-FF circuit 71 latches the H-level, so the signal level at its Q-terminal changes from the L-level to the H-level. The change from the L-level to the H-level at the Q-terminal of the D-FF circuit 71 is applied as the restore signal to the D-FF circuit 76, so the signal level at the Q-terminal of the D-FF circuit 76 changes from the L-level to the H-level, turning on the switching element 60. In result, the circuit from the battery 35 to the base of the oscillation transistor 41 is closed, enabling the charging circuit 51 and thus the flash device 23 to work.

After re-enabling the flash device 23 to work, the front cover 21 is attached to the basic portion 20, to complete the unit body 2. After passing through inspections, the wrapping member 3 is wrapped around the unit body 2 at the conclusion of manufacturing the film unit.

The film unit is used in the same way as those film units which are not provided with the IC 37. After the completion of all available exposures, the user rotates the film winding wheel 13 continuously to wind up the entire length of the filmstrip 24b into the cartridge shell 24a, and then forwards the film unit to a photofinisher.

The photofinisher opens the bottom lid 22a and removes the cartridge shell 24a containing the exposed filmstrip 24b from the cartridge chamber 26, for developing the exposed filmstrip 24b and making photo-prints from the frames photographed on the film strip 24b. The developed film strip 24b is wound back into the cartridge shell 24a, and is returned to the user together with the photo-prints.

On the other hand, the emptied unit body 2 is collected by the manufacturer of that film unit. The manufacturer disassembles the unit body 2, for reusing some parts as they are, and recycling some parts as materials. As for the flash device 23, after cleaning the flash projector 7 and inspecting the functions, and if the functions are judged to be adequate, the flash device 23 is sent to the manufacturing process, for reusing it in manufacturing a new film unit. Since the power supply to the flash device 23 including the IC 37 is interrupted when the rear cover 22 is removed from the basic portion 20 by the insulating portion 28b or when the battery 35 is removed from the metal contacts 36a and 36b, the switching element 60 has been turned off in the flash device 23 of the disassembled unit body 2. Therefore, it is necessary to input the predetermined cancel signal in the IC 37 in the same way as above for enabling the reused flash device 23 to work, after the reused flash device 23 is attached to the basic portion 20, and a new battery 35 is attached to the reused flash device 23.

On the contrary, if the emptied unit body 2 is collected by a trader, for the sake of reusing the unit body 2 by loading a new photo film cartridge, since it is impossible to load the photo film cartridge without removing the rear cover 22 from the basic portion 20, the power supply to the IC 37 is inevitably interrupted by the insulating portion 28b while the rear cover 22 is being removed. Thus, the switching element 60 is turned off to disable the charging circuit 51. Even if the switching element 60 is turned on by a voltage fluctuation at the start of power supply, since the clear circuit 61 is designed to output the second clear signal to the D-FF circuits 71 and 76 at the start of power supply, and thereby the output from the D-FF circuits 71 and 76 is reset to the L-level, the switching element 60 is turned off immediately after the start of power supply.

As described above, the switching element 60 is maintained off unless the restore signal is applied thereto by entering the predetermined cancel signal in the proper way as set forth above. Therefore, it is very hard to restore the flash device 23 to the active condition for other traders than the granted manufacturer of the film unit. Moreover, since the oscillation transistor 41, the IC 37 and the wiring around these elements are covered with the protection layer 42, it is also hard to remove the IC 37 or modify the wiring for the purpose of restoring capability of charging of the charging circuit 51 without the cancel signal. In this way, the manufacturer of the film unit can hinder other traders from reusing the emptied unit body 2 or the flash device 23 of the used film unit.

Although the switching element 60 is connected in the circuit from the battery to the base of the oscillation transistor 41 in the above embodiment, it is possible to connect the switching element 60 to the emitter of the oscillation transistor 41, as show by a phantom block 100a in FIG. 4, or to the collect of the oscillation transistor 41, as shown by a phantom block 100b. The switching element 60 may also be connected in one of those positions shown by phantom blocks 100c, 100d, 100e and 100f. However, where the switching element 60 is connected in the position 100f, the switching element 60 is turned on to short-circuit the base and emitter of the oscillation transistor 41, thereby to disable the charging circuit 50 to work. In order to make it hard to modify the hardware, and also make it easy to integrate the switching element 60 and other elements of the security circuit into the IC chip, it is preferable to connect the switching element 60 to the base of the oscillation transistor 41, or in one of the positions 100a to 100c and 100f.

Figure 8:
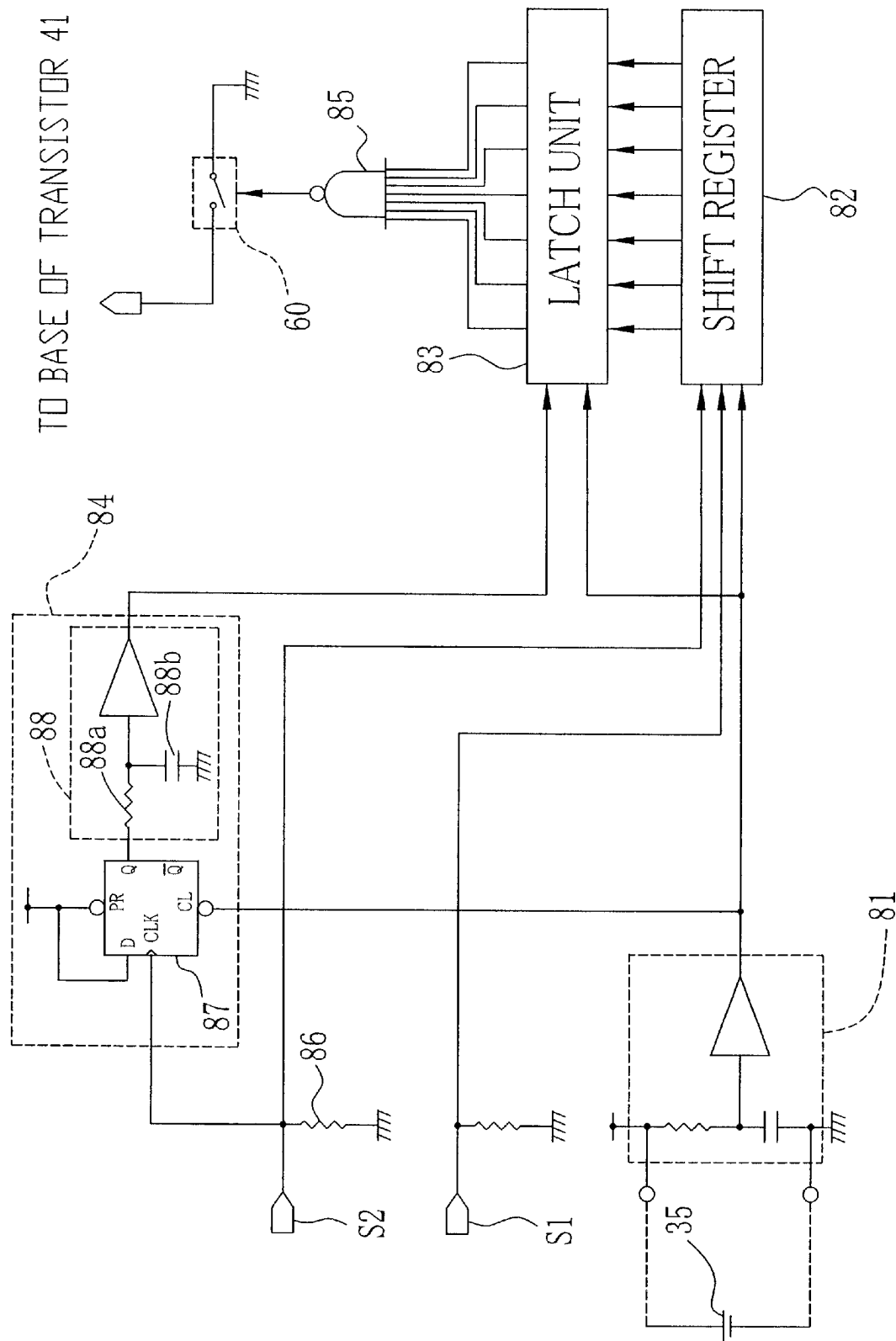
FIG. 8 is a circuit diagram illustrating another embodiment of security circuit for the flash device.
Figure 9:
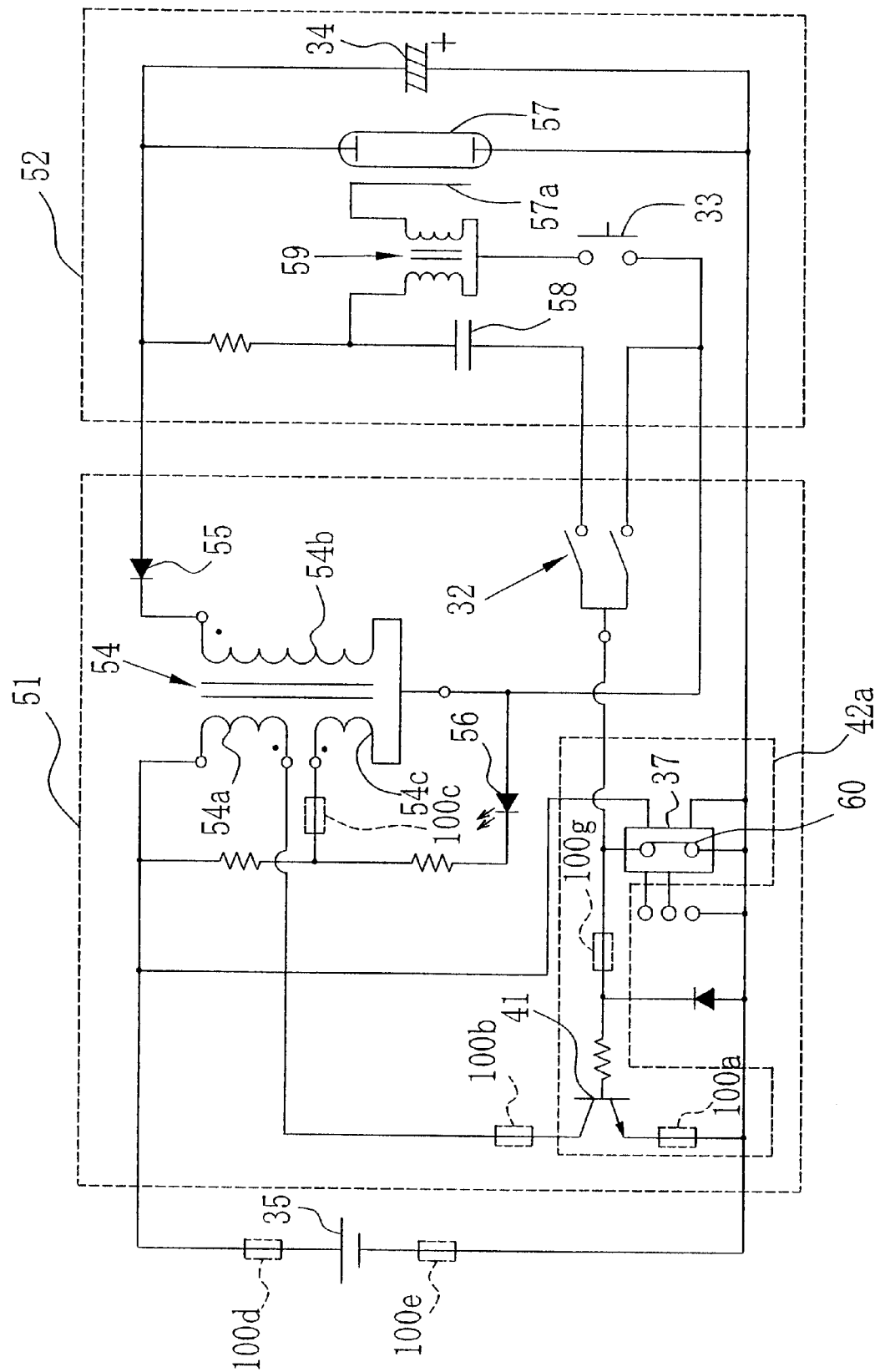
FIG. 9 is a circuit diagram illustrating the flash device with the security circuit connected between a base and an emitter of an oscillation transistor.

FIG. 8 shows another embodiment of security circuit integrated into the IC 37. This embodiment will be described on the assumption that a switching element 60 of the IC 37 is connected in the base-emitter circuit of the oscillation transistor 41, as shown in FIG. 9. Therefore, the IC 37 is designed to turn on the switching element 60 as soon as the power supply is interrupted. By turning on the switching element 60, the input terminals of the oscillation transistor 41 are short-circuited, so the oscillation transistor 41 is deactivated, and the charging operation stops. Unless a predetermined cancel signal is applied to the IC 37, the switching element 60 is maintained in this ON position, and thus keeps the flash device 23 inactive. As the cancel signal, a predetermined clock signal and a digital code signal are used in combination. The clock signal is applied serially through the first input terminal S1, and the digital code signal, which is representative of a predetermined binary code, and is applied serially through the second input terminal S2.

Figure 10:
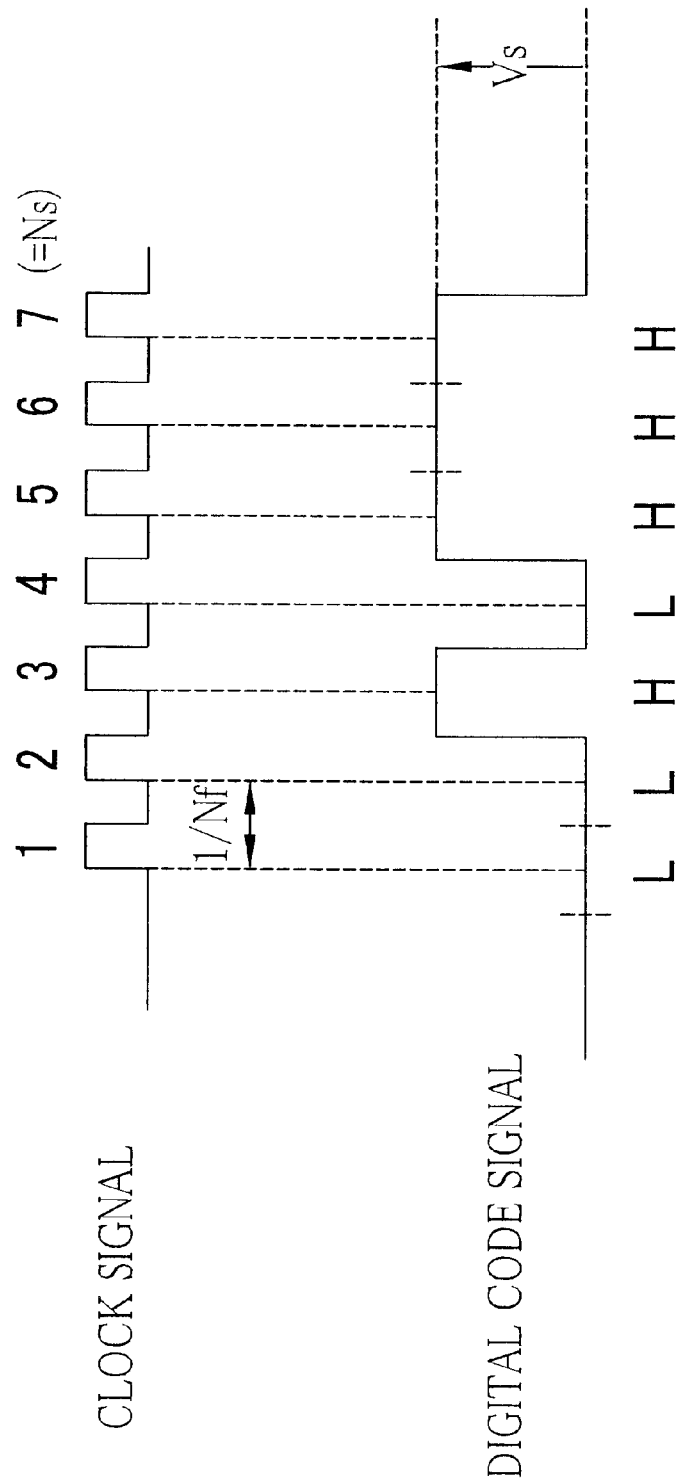
FIG. 10 is a timing chart illustrating a cancel signal for use with the security circuit of FIG. 8, the cancel signal being a combination of a clock signal and a digital code signal.

An embodiment of the cancel signal is shown in FIG. 10. The clock signal must have a predetermined pulse number Ns, whereas the digital code signal must represent a digital code of a bit number that is equal to the pulse number Ns and must be applied in synchronization with the clock signal. Also, a high level of the digital code, that represents a value "H" of the binary code, must be higher than a predetermined voltage level Vs relative to a low level voltage representative of a value "L" of the binary code. In this embodiment, the low level voltage is 0 V, and the predetermined voltage level Vs is 3.5 V.

In order to make it harder to remove the prohibition of charging the flash device 23 by the IC 37, frequency Nf of the clock signal is also predetermined. In this way, the flash device 23 is prohibited from being charged again unless the clock signal of the pulse number Ns and the clock frequency Nf, and the digital code signal representing the predetermined binary code and having the set voltage Vs are applied to the input terminals S1 and S2 in synchronization with each other. According to the embodiment shown in FIG. 10, the pulse number Ns is "7", and the binary code is "LLHL-HHH". The clock frequency Nf is predetermined to be not less than "10 MHz".

As shown in FIG. 8, the IC 37 includes the switching element 60, a clear circuit 81, a shift register 82, a latch unit 83, a latch signal generator circuit 84, and a NAND circuit 85. The clear circuit 81 outputs a low (L) level clear signal for a given time from the start of power supply from battery 35 to the IC 37. The clear signal is sent to the shift register 82, the latch unit 83, and the latch signal generator circuit 84, to initialize these components.

A resistor 86 is connected between the second input terminal S2 and the grand, for defining a threshold value of discrimination between the H level and the L level of the digital code signal. Specifically, the resistor 86 has a resistance through which the voltage Vs is lowered to a lower limit voltage for the shift register 82 to regard it as the H level. Therefore, only when the signal applied to the second input terminal S2 takes the set value Vs, i.e. 3.5 V in this instance, or more, the shift register 82 regards that signal as a binary "H".

On the other hand, a resistor connected to the first input terminal S1 has a resistance that is large enough for allowing the clock signal to have such an amplitude that is sufficient for an ordinary digital circuit to discriminate between H and L levels. But it is possible to predetermine the pulse voltage of the clock signal by adjusting the resistance of the resistor at the first input terminal S1.

Figure 11:
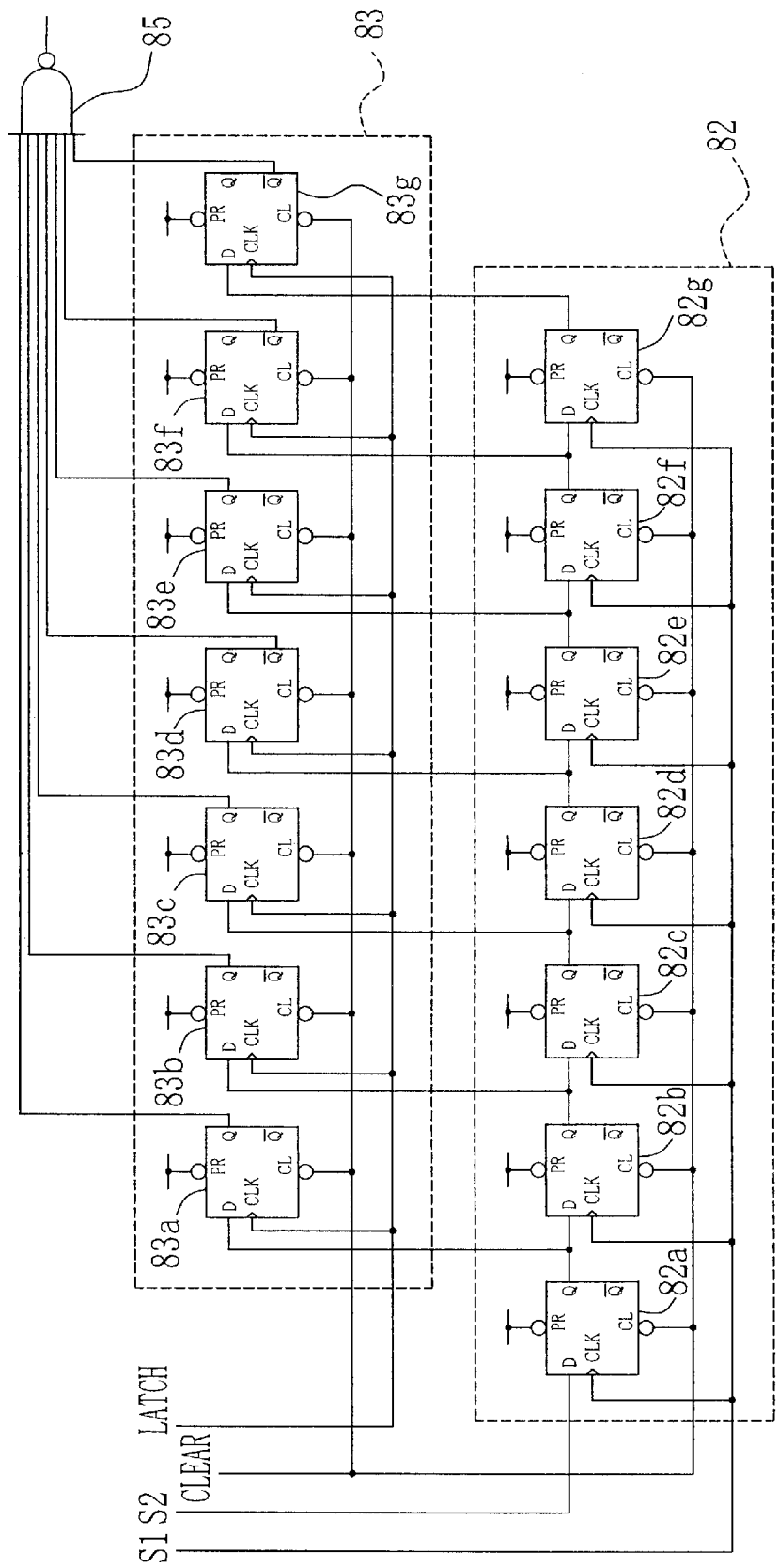
FIG. 11 is a circuit diagram illustrating a shift register and a latch unit of the security circuit of FIG. 8.

As shown in FIG. 11, the shift register 82 is constituted of seven D-FF circuits 82a, 82b, 82c, 82d, 82e, 82f and 82g. The D-FF circuits 82a to 82f individually output a low level signal from their Q-thermals upon receipt of the clear signal from the clear circuit 81. When the clock signal is applied to the first input terminal S1, the first D-FF latches a high or low signal level in accordance with the voltage level of the signal applied to the second input terminal S2 at every leading edge, and outputs a signal of corresponding level H or L from its Q-terminal.

Accordingly, the first D-FF circuit 82a outputs a high level signal H when the voltage of the signal at the second terminal S2 is 3.5 V or more, and outputs a low level signal L when the voltage of the digital code signal is less than 3.5 V. Other D-FF circuits 82b to 82g respectively latch the signal output from the Q-terminal of the preceding D-FF circuit 82a to 82f, and outputs the same level signal from their own Q-terminals. The shift register 82 sends the 7-bit output signals from the Q-terminals of the respective D-FF circuits 82a to 82g in parallel to the latch unit 83.

The latch unit 83 is constituted of seven D-FF circuits 83a, 83b, 83c, 83d, 83e, 83f and 83g. The D-FF circuits 83a to 83g latch the signal levels from the corresponding D-FF circuits 82a to 82g of the shift register 82, and output these signal levels in parallel when a latch signal is applied from the latch signal generator circuit 84. Among of the D-FF circuits 83a to 83g, the first to third D-FF circuits 83a to 83c and the fifth D-FF circuit 83e are determined to use their Q-terminals, whereas the fourth, sixth and seventh D-FF circuits 83d, 83f and 83g are determined to use their inverted Q-terminals in this embodiment.

Since the digital code signal is "LLHLHHH" in this embodiment, where the digital code signal is properly applied to the shift register 82, and thus the corresponding signal levels are applied to the latch unit 83, all of the D-FF circuits 83a to 83g output H level signals from the respective output terminals. Concretely, when the digital code signal is properly applied, the output signals from the first to third and fifth D-FF circuits 82a to 82c and 82e are high level, so the first to third and fifth D-FF circuits 83a to 83c and 83e output high level signals from the Q-terminals, whereas the output signals from the fourth, sixth and seventh D-FF circuits 82d, 82f and 82g are low level, so the fourth, sixth and seventh D-FF circuits 83d, 83f and 83g output high level signals from the inverted Q-terminals. Since the clear signal from the clear circuit 81 is low level, the first to third and fifth D-FF circuits 83a to 83c and 83e output low level signals from the Q-terminals, and the fourth, sixth and seventh D-FF circuits 83d, 83f and 83g output high level signals from the inverted Q-terminals, respectively in response to the clear signal.

Referring back to FIG. 8, the latch signal generator circuit 84 is constituted of a D-FF circuit 87 and a delay circuit 87. The D-FF circuit 87 outputs a low level signal from its Q-terminal when the clear signal is applied from the clear circuit 81. When the signal applied to a clock (CLK) terminal of the D-FF circuit 87 changes from a low level to a high level, an output signal from a Q-terminal of the D-FF circuit 87 changes from a low level to a high level.

Because the clock terminal of the D-FF circuit 87 is connected to the second input terminal S2, the D-FF circuit 87 outputs the high level signal from the Q-terminal, when the voltage of the input signal at the second input terminal S2 goes above 3.5 V, in the same way as the shift register 82.

The Q-terminal of the D-FF circuit 87 is connected to the delay circuit 88, so the high level signal from the Q-terminal of the D-FF circuit 87 is sent to the latch unit 83 with a constant delay time Ta, and is served as the latch signal. The delay circuit 88 defines the clock frequency Nf of the clock signal. As described above, the latch unit 83 latches the output signals from the shift register 82 upon receipt of the latch signal. Therefore, the shorter the delay time Ta, it is necessary to complete the input of the clock signal as well as the digital code signal in the short time by using the higher clock frequency Nf, for the shift register 82 to finish reading the 7-bit digital code signal and the latch unit 83 to latch this signal. Accordingly, a lower limit of the clock frequency Nf depends on the delay time Ta.

The delay time Ta is defined by adjusting the resistance of a resistor 88a and a capacitance of a capacitor 88b of the delay circuit 88 on the basis of the clock frequency Nf to set and the digital code. The latch signal may alternatively be generated at a predetermined time after the initial leading edge of the clock signal.

The 7-bit output signals from the latch unit 83 are sent in parallel to the NAND circuit 85. The NAND circuit 85 outputs a low level signal only when all of the 7-bit output signals from the latch unit 83 are high level, and outputs a high level signal in other cases. The output signal from the NAND circuit 85 is sent to the switching element 60.

The switching element 60 is turned on while it is not supplied from the battery 35, and also while the output from the NAND circuit 85 takes the-level. As the switching element 60 in the ON position short-circuits the input terminals of the oscillation transistor 41, the charging circuit 51 is deactivated. When the output from the NAND circuit 85 becomes L-level, the switching element 60 is turned off, allowing the charging circuit 51 to start charging. Thus, the L-level signal from the NAND circuit 85 is served as a restore signal for restoring the flash device 23 to the active condition, and the shift register 82, the latch unit 83, the latch signal generator circuit 84 and the NAND circuit 85 constitute a restoring circuit.

According to this configuration, the switching element 60 is turned on to prohibit charging not only by interrupting power supply to the flash device 23 but also by applying the L-level clear signal to the latch unit 83, because some of the output signals from the latch unit 83 take the low level upon the clear signal.

Only when the conditions of the pulse number Ns, the clock frequency Nf, the set voltage Vs, and the digital code are entirely satisfied, the output of the NAND circuit 85 takes the L-level, and turns off the switching element 60 to remove the prohibition of charging the charging circuit 51. Therefore, it is very hard for other traders than the granted manufactures to remove the prohibition of charging by the security circuit. The security circuit of this embodiment also has a simple construction consisting of logic circuits and other simple elements, so it may be integrated into the IC chip at a low cost. Because analog processing is not needed, the IC 37 does not need to be a BiCMOS IC, but may be a CMOS IC.

Figure 12:
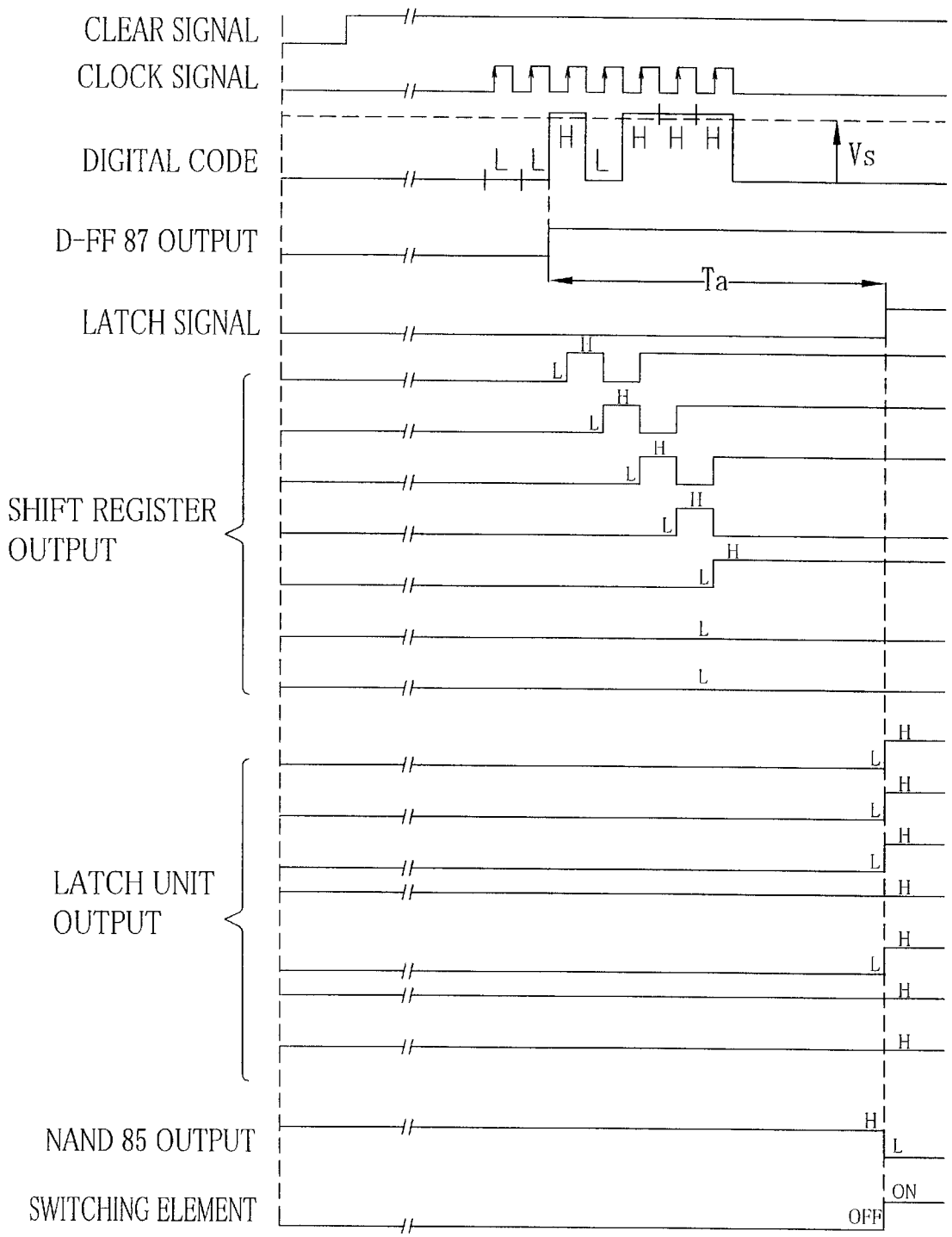
FIG. 12 is a timing chart illustrating operation of the security circuit of FIG. 8.

Now the operation of the security circuit of FIG. 8 will be briefly described with reference to FIG. 12.

When the battery 35 is put in between the metal contacts 36a and 36b, to start supplying the flash device 23 including the IC 37, the clear circuit 81 outputs the clear signal of L-level for the predetermined time to the shift register 82, the latch unit 83, and to the latch signal generator circuit 84. In results, all of the 7-bit output signals from the shift register 82 take the L-level, and the D-FF circuits 83a, 83b, 83c and 83e of the latch unit 83 output L-level signals from their Q-terminals, so the output of the NAND circuit 85 takes the H-level. Therefore, the switching element 60 is turned on to disable the charging circuit 51 of the flash device 23 immediately after the start of power supply, even if the output of the NAND circuit 85 takes the L-level for some reasons, such as a voltage fluctuation at the start of power supply.

To re-enable the charging circuit 51 to work, the cancel signal consisting of the clock signal and the digital code signal must be entered to the IC 37, so three output terminals of a specific cancel signal generator are connected to the first and second input terminals S1 and S2 and the grand terminal G.

Then the cancel signal generator enters the clock signal to the first input terminal S1 at the predetermined clock frequency Nf and the predetermined pulse number Ns, and the digital code signal representative of "LLHLHHH" to the second input terminal S2, wherein the digital code signal changes its voltage level in synchronization with the clock signal, and has the voltage level of 3.5 V or more for the binary "H".

The clock signal is sent to the shift register 82, while the digital code signal is sent to the shift register 82 and the D-FF circuit 87 of the latch signal generator circuit 84. Although the voltage level for the binary "H" of the digital code signal is lowered through the resistor 86, since it is originally not less than 3.5 V, the shift register 82 and the D-FF circuit 87 can discriminate the binary "H" level.

When the first clock pulse of the clock signal is applied to the first input terminal S1, the first D-FF circuit 82a of the shift register 82 latches the signal level of the digital code signal applied to the second input terminal S2 at that time. When the second clock pulse of the clock signal is applied to the first input terminal S1, the first D-FF circuit 82a of the shift register 82 latches the signal level of the digital code signal applied to the second input terminal S2 at that time, while the second D-FF circuit 82b latches the signal level that was latched by the first D-FF circuit 82a at the first clock pulse. When the third clock pulse of the clock signal is applied to the first input terminal S1, the first D-FF circuit 82a of the shift register 82 latches the signal level of the digital code signal applied to the second input terminal S2 at that time, and the second D-FF circuit 82b latches the signal level that was latched by the first D-FF circuit 82a at the second clock pulse, while the third D-FF circuit 82b latches the signal level that was latched by the second D-FF circuit 82a at the second clock pulse. In this way, when the seventh clock pulse is applied to the first input terminal S1, the seventh to first D-FF circuits 82g to 82a respectively latch the signal levels of the digital code data DAT corresponding to the binary code "LLHLHHH" in this order from the seventh.

On the other hand, when the third bit of binary "H" of the digital code signal is applied to the second input terminal S2, the signal level at the clock terminal of the D-FF circuit 87 of the latch signal generator circuit 84 changes to the H-level. Thus, the output signal from the D-FF circuit 87 changes from the L-level to the H-level. After being delayed by the time Ta through the delay circuit 88, the H-level signal is applied as the latch signal to the latch unit 83. Then, the respective D-FF circuits 83a to 83g of the latch unit 83 simultaneously latch the output signals from the corresponding D-FF circuit 82a to 82g of the shift register 82.

Since the delay time Ta and the clock frequency Nf are determined such that entrance of the clock signal and the digital code signal is completed at the time when the latch signal is applied to the latch unit 83, the output signals latched by the D-FF circuits 83a to 83g correspond to the digital code signal. So the first to third and fifth D-FF circuit 83a to 83c and 83e latch the H-level signals, and output them from their Q-terminals, whereas the fourth, sixth and seventh D-FF circuits 83e, 83f and 83g latch the L-level signals, and output the H-level signals from their inverted Q-terminal.

Since all of the output signals from the latch unit 83 take the H-level, the NAND circuit 85 outputs the L-level signal as the restore signal to the switching element 60. Upon the restore signal, the switching element 60 is turned off to disconnect the input terminals of the oscillation transistor 41 from each other, thereby allowing the charging circuit 51 to work.

Once the power supply to the flash device 23 including the IC 37 is interrupted through the insulating portion 28b by removing the rear cover 22 from the basic portion 20, or by removing the battery 35 itself from the metal contacts 36a and 36b, or once the power source voltage goes below the predetermined level, the switching element 60 has been turned. Therefore, it is necessary to input the predetermined cancel signal in the IC 37 in the same way as above for enabling reusing the flash device 23.

Therefore, even if the emptied unit body 2 is collected by a trader, for the sake of reusing the unit body 2 by loading a new photo film cartridge, since it is impossible to load the photo film cartridge without removing the rear cover 22 from the basic portion 20, the power supply to the IC 37 is inevitably interrupted by the insulating portion 28b while the rear cover 22 is being removed. Thus, the switching element 60 is turned on to disable the charging circuit 51. Even if the switching element 60 is turned off by a voltage fluctuation at the start of power supply, since the clear circuit 81 is designed to output the L-level clear signal to the D-FF circuit 87, the shift register 82 and the latch unit 83 at each start of power supply to the IC 37, the switching element 60 is turned on immediately after the start of power supply.

As described above, the switching element 60 is maintained on unless the restore signal is applied thereto by entering the predetermined cancel signal in the proper way as set forth above. Therefore, it is very hard to restore the flash device 23 to the active condition for other traders than the granted manufacturer of the film unit. Moreover, since the oscillation transistor 41, the IC 37 and the wiring between these elements are covered with the protection layer 42, it is also hard to remove the IC 37 or modify the wiring to restore ability of charging of the charging circuit 51. In this way, the manufacturer of the film unit can hinder other traders from reusing the emptied unit body 2 or the flash device 23 of the used film unit.

The switching element 60 of the security circuit shown in FIG. 8 may also be connected to another place of the charging circuit 51 as shown by phantom blocks 100a to 100e or 100g. In these positions, the switching element 60 must be turned off to disable the charging circuit 51, and turned on in response to the restore signal.

The pulse number Ns, the clock frequency Nf, the predetermined voltage Vs, and the digital code are not to be limited to the above mentioned values, but may be modified appropriately. For example, these values may be changed by the unit of manufacture lot of the IC 37.

Figure 13:
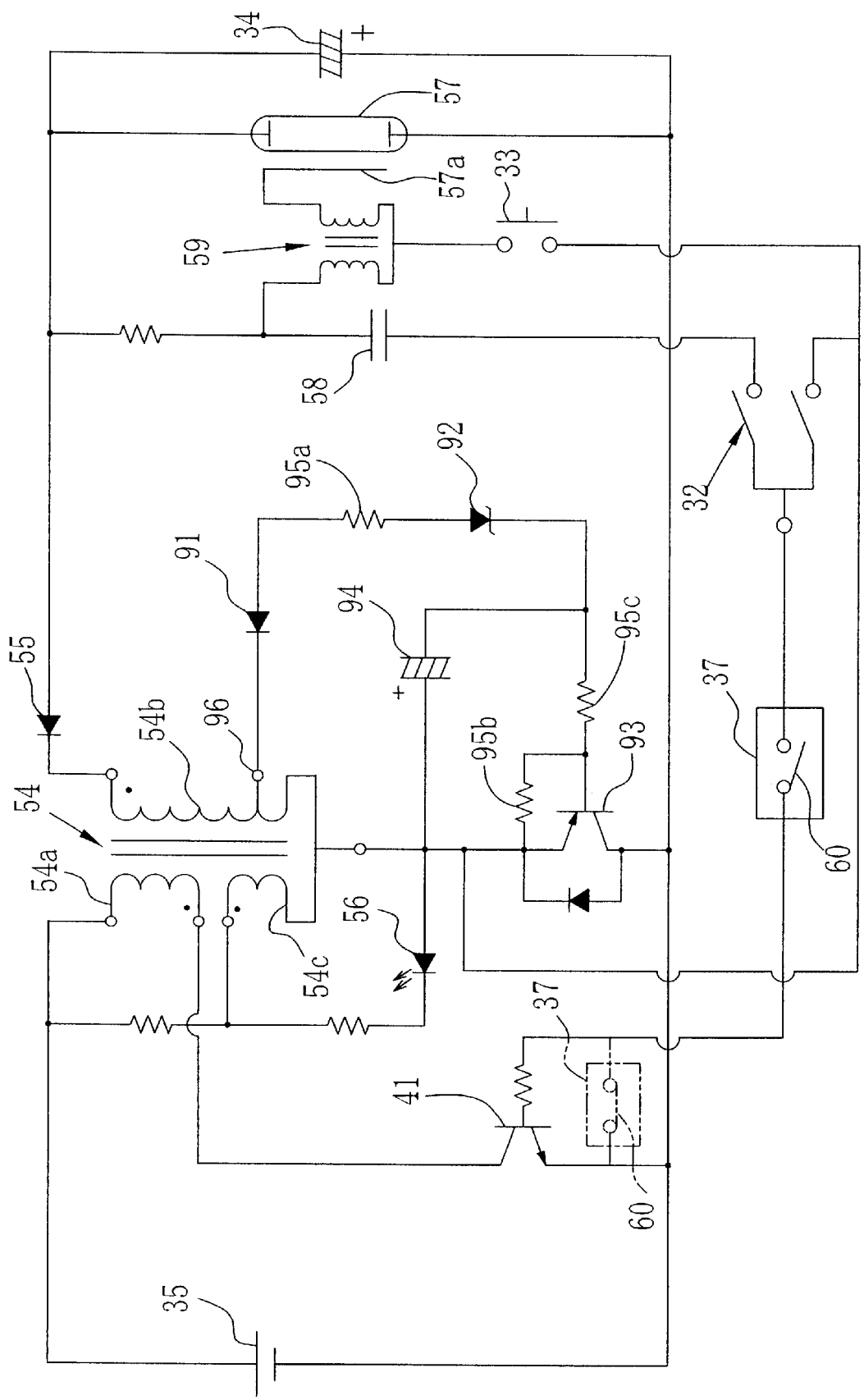
FIG. 13 is a circuit diagram illustrating another embodiment of flash device with a security circuit.

Although the flash device 23 of the above two embodiments have the same circuit construction, the security circuit of the invention may be usable in any kinds of flash devices. FIG. 13 shows an example of other circuit construction of the flash device 23, wherein equivalent elements of the flash device to the above embodiments are designated by the same reference numbers, in order to omit detailed description of those elements. In FIG. 13, the switching element 60 of the IC 37 is connected to a base of an oscillation transistor 41, so the flash circuit of FIG. 13 is disabled by turning off the switching element 60, and the switching element 60 is turned on in response to a restore signal. However, it is possible to connect the switching element 60 in between the base and an emitter of the oscillation transistor 41. In that case, the switching element 60 is turned off in response to a restore signal.

The flash circuit shown in FIG. 13 is provided with an automatic charging-stopping circuit for stopping charging a main capacitor 34 when it is charged up to a predetermined set voltage, and restarting charging when the charged voltage goes below a predetermined level. Specifically, the automatic charging-stopping circuit is mainly constituted of a diode 91, a Zener diode 92, a stopping transistor 93, and a stopping capacitor 94. A cathode of the diode 91 is connected to an intermediate tap 96 of a secondary coil 54b of an oscillation transformer 54, and an another of the diode 91 is connected to an another of the Zener diode 92. The diode 91 rectifies an alternating voltage generated at the intermediate tap 96, and conducts minus waves of the voltage to the Zener diode 92. The Zener diode 92 has a low Zener voltage, e.g. 10 V, and conducts a Zener current in a direction from the cathode to the anode (a backward current) when a backward voltage of more than the Zener voltage is applied across the Zener diode 92.

The potential at the intermediate tap 96 goes up and down along with oscillation of a blocking oscillator consisting of the oscillation transistor 41 and the oscillation transformer 54, while changing its average level in proportion with an increase of the charge voltage of the main capacitor 34. When the main capacitor 34 is charged up to the set voltage, the Zener diode 92 conducts the Zener current, so the stopping capacitor 94 is charged by the Zener current. Upon being charged up to an appropriate voltage, the stopping capacitor 94 is discharged through resistors 95b and 95c. While the voltage across the stopping capacitor 94 is going down to a given voltage, a current flows into a base of the stopping transistor 93, turning on the stopping transistor 93. So long as the stopping transistor 93 is on, the base and emitter of the oscillation transistor 41 is short-circuited, so the oscillation transistor 41 is deactivated.

When the voltage of the stopping capacitor 94 is discharged down to an appropriate level, the stopping transistor 93 is turned off, so the oscillation transistor 41 restarts oscillating if a main switch 32 is maintained on. Thereafter when the main capacitor 34 is charged up to the set voltage again, the Zener diode 94 conducts the Zener current, and the stopping capacitor 94 is charged with the Zener current. Thus, the oscillation transistor 41 is turned off by the current discharged from the stopping capacitor 94. In this way, so long as the main switch 32 is on, the main capacitor 34 is charged up to the set voltage repeatedly.

Figure 14:
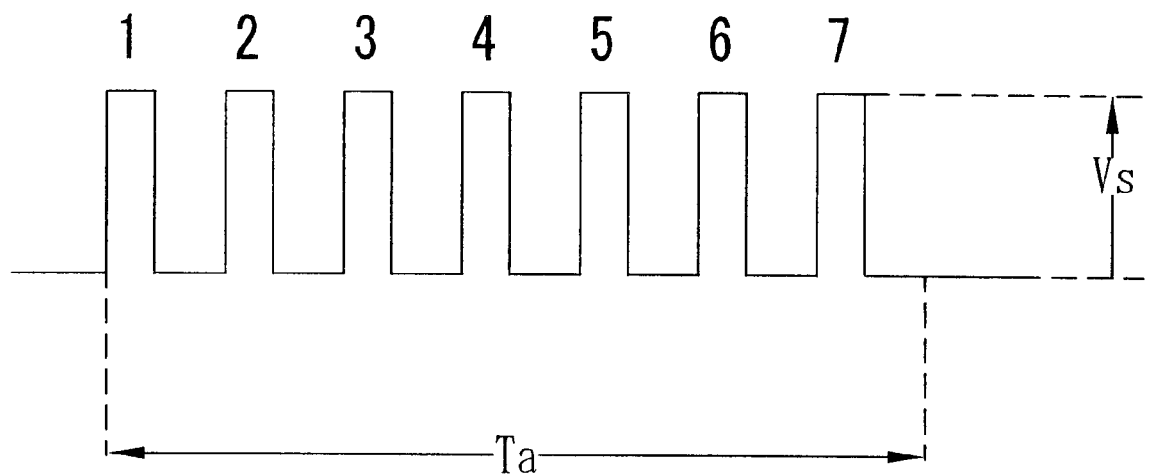
FIG. 14 is a waveform diagram illustrating a cancel signal according to another embodiment of the invention.
Figure 15:
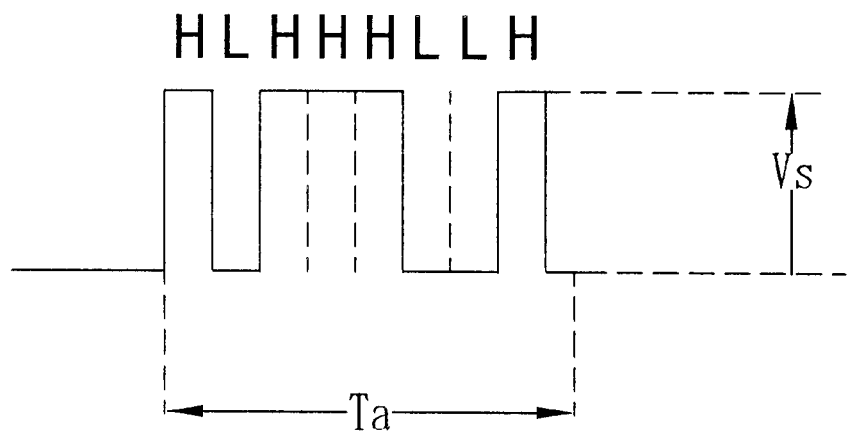
FIG. 15 is a waveform diagram illustrating a cancel signal according to a third embodiment of the invention.

In the embodiments, the cancel signal is constituted of two kinds of signals which are applied in parallel to the IC 37, the cancel signal may be a complex signal. For example, as shown in FIG. 14, a signal having a predetermined pulse number and a predetermined voltage level Vs should be applied within a predetermined time period Ta in order to restore the function of the flash device. FIG. 15 shows another example where the cancel signal is a complex digital code signal defined by the digital code, the voltage level Vs and the entrance time Ta. Where the cancel signal is such a complex signal, the number of input terminals necessary for inputting the cancel signal to the security circuit is reduced.

In the above embodiment, the insulating plate 28 is provided for disconnecting the battery 35 for a moment from the flash device 23 and thus from the IC 37 when the rear cover 22 is separated from the basic portion 20, it is possible to design the film unit that the battery is separated from the flash device in cooperation with the separation of the rear cover from the basic portion. It is also possible to connect the battery to the security circuit through lead lines that are removable from the flash circuit board, and mechanically interconnect the lead lines with the rear cover such that the lead lines are removed from the flash circuit board with the removal of the rear cover.

Although the security circuit of the above embodiments is designed to disable charging the flash device upon detection of removal of the rear cover of the film unit by a termination of the power supply, the security circuit may be designed to disable charging upon detection of removal of another part of the film unit. For example, since it is necessary to separate the front cover from the basic portion for resetting the frame counter to an initial position prior to reusing the used film unit, or for removing the flash device, it is possible to design the film unit such that the power supply to the security circuit is terminated when the front cover is separated.

It is possible to design the security circuit to disable charging when it is detected that the entire length of the exposed filmstrip is wound up into the cartridge shell, or that the cartridge shell containing the exposed filmstrip is removed. For example, the film unit may be designed such that the power supply is stopped when a leading end of the filmstrip passes through a film passageway from the film chamber to the cartridge chamber, or when a door member is closed with respect to the IX 240 type photo film cartridge, or when the bottom lid of the cartridge chamber is opened.

It is also possible to output a reset signal with the removal of the rear or the front cover or the exposed photo film cartridge, and send the detection signal to the security circuit, so that the security circuit disables the flash device in response to the detection signal. The security circuit may be provided with a counter that counts down the number of executed exposures, and outputs a reset signal in order to disable the flash device when the count comes down to zero. In those cases, the switching element of the security circuit is operated in response to the reset signal to disable the flash device.

Thus, the present invention is not to be limited to the embodiments shown in the drawings but, on the contrary, various modifications will be possible to those skilled in the art without departing from the scope of appended claims.

What is claimed is:

1. A flash device for a lens-fitted photo film unit preloaded with a roll of unexposed photo filmstrip and having photographic mechanisms for photography on the filmstrip, the flash device comprising a charging circuit for charging a main capacitor, a battery connected to the charging circuit in a removable fashion, and a discharging circuit for discharging the main capacitor through a flash discharge tube, characterized by comprising:

first means for outputting a restore signal when a pulse signal having a predetermined number of pulses and a voltage signal having a predetermined voltage level are concurrently inputted from an external device; and second means for switching a switching element connected to the charging circuit, such that the second means switches the switching element to a disabling position for disabling the charging circuit when a particular part of the film unit is removed or when completed use of the film unit is detected or when voltage of the battery goes below a lower limit, and that the second means switches the switching element to an enabling position for enabling the charging circuit to work in response to the restore signal.

2. A flash device for a lens-fitted photo film unit as claimed in claim 1, wherein the first means outputs the restore signal when entrance of the pulse signal is completed within a predetermined time from an initial input of the predetermined voltage level to the first means.

3. A flash device for a lens-fitted photo film unit as claimed in claim 1, wherein the switching element connected to an oscillation transistor of the charging circuit to turn on or off the oscillation transistor, and the first and second means are integrated into an IC, and is mounted on a circuit board on which the charging and discharging circuit are formed.

4. A flash device for a lens-fitted photo film unit as claimed in claim 3, wherein the IC and the oscillation transistor are individually formed as surface mounting chips, mounted adjacent to each other on the circuit board, and are covered in a protection layer together with printed wiring around these elements.

5. A flash device for a lens-fitted photo film unit preloaded with a roll of unexposed photo filmstrip and having photographic mechanisms for photography on the filmstrip and a flash device, the flash device comprising a charging circuit for charging a main capacitor, a battery connected to the charging circuit in a removable fashion, and a discharging circuit for discharging the main capacitor through a flash discharge tube, characterized by comprising:

first means for outputting a restore signal when a digital code signal representative of a binary code and having a predetermined voltage level is inputted serially to the first means in synchronism with a clock signal having a predetermined number of pulses; and second means for switching a switching element connected to the charging circuit, such that the second means switches the switching element to a disabling position for disabling the charging circuit when a particular part of the film unit is removed or when completed use of the film unit is detected or when voltage of the battery goes below a lower limit, and that the second means switches the switching element to an enabling position for enabling the charging circuit to work in response to the restore signal.

6. A flash device for a lens-fitted photo film unit as claimed in claim 5, wherein the first means outputs the restore signal when the clock signal is inputted at a predetermined frequency.

7. A flash device for a lens-fitted photo film unit as claimed in claim 5, wherein the switching element connected to an oscillation transistor of the charging circuit to turn on or off the oscillation transistor, and the first and second means are integrated into an IC, and is mounted on a circuit board on which the charging and discharging circuit are formed.

8. A flash device for a lens-fitted photo film unit as claimed in claim 7, wherein the IC and the oscillation transistor are individually formed as surface mounting chips, mounted adjacent to each other on the circuit board, and are covered in a protection layer together with printed wiring around these elements.

9. A lens-fitted photo film unit preloaded with a roll of unexposed photo filmstrip and having photographic mechanisms for photography on the filmstrip and a flash device, the flash device comprising a charging circuit for charging a main capacitor, a battery connected to the charging circuit in a removable fashion, and a discharging circuit for discharging the main capacitor through a flash discharge tube, characterized by comprising:

a device for disconnecting the battery from the charging circuit in cooperation with removal of a particular part of the film unit;

a clear circuit for outputting a clear signal at each start of power supply from the battery to the charging circuit;

a restoring circuit for outputting a restore signal in response to a predetermined cancel signal that is applied from an external device; and a switching circuit connected to the charging circuit, the switching circuit being switched to a disabling position for disabling the charging circuit in response to the clear signal from the clear circuit or when power supply voltage from the battery goes below a particular lower limit, or alternatively to an enabling position for enabling the charging circuit to work in response to the restore signal from the restoring circuit.

10. A lens-fitted photo film unit as claimed in claim 9, wherein the cancel signal is a combination of a pulse signal having a predetermined number of pulses and a voltage signal having a predetermined voltage level, which are concurrently inputted to the restoring circuit.

11. A lens-fitted photo film unit as claimed in claim 9, wherein the cancel signal is a pulse signal having a predetermined number of pulses and a predetermined voltage level.

12. A lens-fitted photo film unit as claimed in claim 10 or 11, wherein the restoring circuit outputs the restore signal only when entrance of the pulse signal to the restoring circuit is completed within a predetermined time from an initial input of the predetermined voltage level to the restoring circuit.

13. A lens-fitted photo film unit as claimed in claim 10 or 11, wherein the pulse number and the voltage level are modified according to a rule that is defined by a manufacturer of the film unit.

14. A lens-fitted photo film unit as claimed in claim 9, wherein the cancel signal comprises a clock signal having a predetermined number of pulses and a digital code signal representative of a binary code and having a predetermined voltage level, the digital code signal being inputted serially to the restoring circuit in synchronism with the clock signal.

15. A film unit photo lens-fitted as claimed in claim 14, wherein the restoring circuit outputs the restore signal when the clock signal is inputted at a predetermined frequency.

16. A lens-fitted photo film unit as claimed in claim 9, wherein the switching circuit includes a switching element connected to an oscillation transistor of the charging circuit to turn on or off the oscillation transistor.

17. A lens-fitted photo film unit as claimed in claim 16, wherein the clear circuit, the restoring circuit and the switching circuit are integrated into a surface mounting chip, that is mounted in adjacent to the oscillation transistor on a circuit board having the charging and discharging circuit formed thereon, and wherein the surface mounting chip, the oscillation transistor and printed wiring around these elements are covered in a protection layer.

\* \* \* \* \*